United States Patent
Kumar et al.

(10) Patent No.: US 11,417,058 B2
(45) Date of Patent: Aug. 16, 2022

(54) ANTI-ALIASING TWO-DIMENSIONAL VECTOR GRAPHICS USING A MULTI-VERTEX BUFFER

(71) Applicant: Adobe Inc., San Jose, CA (US)

(72) Inventors: Harish Kumar, Noida (IN); Anmol Sud, New Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/019,881

(22) Filed: Sep. 14, 2020

(65) Prior Publication Data

US 2022/0084283 A1 Mar. 17, 2022

(51) Int. Cl.
| | |
|---|---|
| *G06T 17/10* | (2006.01) |
| *G06T 17/20* | (2006.01) |
| *G06T 15/00* | (2011.01) |
| *G06T 15/50* | (2011.01) |
| *G06T 1/20* | (2006.01) |
| *G06T 1/60* | (2006.01) |

(52) U.S. Cl.
CPC ............... *G06T 17/10* (2013.01); *G06T 1/20* (2013.01); *G06T 1/60* (2013.01); *G06T 15/005* (2013.01); *G06T 15/503* (2013.01); *G06T 17/20* (2013.01)

(58) Field of Classification Search
None
See application file for complete search history.

(56) References Cited

U.S. PATENT DOCUMENTS

| | | | | |
|---|---|---|---|---|
| 8,044,955 | B1 * | 10/2011 | Yhann | G06T 11/203 |
| | | | | 345/423 |
| 2014/0204080 | A1 * | 7/2014 | Goel | G06T 1/60 |
| | | | | 345/419 |
| 2014/0267266 | A1 * | 9/2014 | Crassin | G06T 15/08 |
| | | | | 345/424 |
| 2015/0145880 | A1 * | 5/2015 | Smith | G06T 11/40 |
| | | | | 345/557 |

(Continued)

OTHER PUBLICATIONS

Apple Developer Website; "Metal: Accelerating graphics and much more." Date downloaded Sep. 21, 2020; https://developer.apple.com/metal/.

(Continued)

*Primary Examiner* — Michelle Chin
(74) *Attorney, Agent, or Firm* — Keller Preece PLLC

(57) ABSTRACT

Methods, systems, and non-transitory computer readable storage media are disclosed for utilizing a central processing unit to generate a compressed multi-vertex buffer to include rendering data from tessellated geometry of a two-dimensional vector graphic for rendering the two-dimensional vector graphic via a GPU rendering pipeline. For example, the disclosed system generates an expanded geometry for control triangles within the tessellated geometry based on an anti-aliasing direction. The disclosed system generates multi-vertex buffer entries including vertex locations and visual attributes (e.g., color, primitive type, anti-aliasing direction, stroke width) of the vector paths corresponding to each triangle in the tessellated geometry. Furthermore, the disclosed system renders the two-dimensional vector graphic by passing the rendering data stored in the compressed multi-vertex buffer to the graphics processing unit in a manner that the graphics processing unit is able to process.

20 Claims, 14 Drawing Sheets

(56) References Cited

U.S. PATENT DOCUMENTS

2015/0178974 A1\* 6/2015 Goel ................... G06T 11/203
                                                    345/420
2018/0033168 A1\* 2/2018 Ben ..................... G06T 3/4084

OTHER PUBLICATIONS

OpenGL; The Industry's Foundation for High Performance Graphics; "From Games to Virtual Reality, Mobile Phones to Supercomputers" Date downloaded Sep. 21, 2020 https://www.opengl.org.
OpenGL; "Geometry shaders"; Geometry shaders; Date downloaded Sep. 21, 2020; https://open.gl/geometry.
Nehab et al.; "Random-Access Rendering of General Vector Graphics"; Dec. 2008 http://hhoppe.com/ravg.pdf.
Wikipedia: The Free Encyclopedia; "Vatti clipping algorithm"; Date downloaded Sep. 21, 2020; https://en.wikipedia.org/wiki/Vatti_clipping_algorithm.

\* cited by examiner

ANTI-ALIASING TWO-DIMENSIONAL VECTOR GRAPHICS USING A MULTI-VERTEX BUFFER

BACKGROUND

Improvements to computer processing technologies have led to significant advancements in the field of image processing and rendering. For example, vector graphics allow a computing device to render visual data at any resolution without quality loss due to the way the visual data is generated and stored in vector graphics. Specifically, rendering a vector graphic involves scaling vector paths based on a rendering resolution and applying anti-aliasing to the vector paths so that the quality of the vector graphic does not degrade with respect to rendering resolution. Additionally, computing systems typically use central processing units ("CPUs") and graphics processing units ("GPUs") to process and render visual data on display devices. To illustrate, when rendering a vector graphic, a computing device utilizes a CPU to prepare visual data associated with the vector graphic (e.g., via an imaging application) and then utilizes a GPU to render the data on a display device based on the visual data prepared by the CPU.

Some conventional anti-aliasing systems utilize hardware based anti-aliasing techniques such as multisample anti-aliasing. These conventional systems perform many computations across a plurality of pixel samples to anti-alias an image at a given resolution. Because of the high number of computations for anti-aliasing using multisample anti-aliasing techniques, these conventional systems suffer from high memory usage, especially when rendering complex real-world artworks or when rendering at high resolutions (e.g., for high-resolution displays). Thus, the conventional systems that rely on hardware based anti-aliasing lack efficiency because of the increased memory usage and slower processing times, which causes such systems to be unusable in many image processing applications.

Additionally, some conventional anti-aliasing systems utilize geometry spread based anti-aliasing by leveraging rendering frameworks that include geometry shaders. In particular, the conventional systems that provide resolution-independent anti-aliasing (e.g., for two-dimensional vector graphics) rely on the presence of the geometry shaders in the rendering pipeline. While the conventional systems make use of geometry shaders in some rendering frameworks to perform resolution-independent anti-aliasing, the conventional systems are limited to those rendering frameworks. Because these conventional systems rely on geometry shaders, such systems lack flexibility because they are unable to perform resolution-independent anti-aliasing under rendering frameworks that do not utilize geometry shaders.

SUMMARY

One or more embodiments provide benefits and/or solve one or more of the foregoing or other problems in the art with systems, methods, and non-transitory computer readable storage media that render two-dimensional vector graphics. For example, the disclosed systems generate and utilize a novel compressed multi-vertex buffer that more efficiently encodes and processes rendering data to improve efficiency and flexibility of implementing computer systems. Specifically, the disclosed systems can utilize a central processing unit to generate a compressed multi-vertex buffer to include rendering data from tessellated geometry of a two-dimensional vector graphic for rendering the two-dimensional vector graphic via a rendering pipeline of a graphics processing unit. To illustrate, the disclosed systems generate an expanded geometry for control triangles within the tessellated geometry. The disclosed systems then generate multi-vertex buffer entries including vertex locations and visual attributes (e.g., color, primitive type, anti-aliasing direction, stroke width) of the vector paths corresponding to each triangle in the tessellated geometry. Furthermore, the disclosed systems render the two-dimensional vector graphic by passing the rendering data stored in the compressed multi-vertex buffer to the graphics processing unit in a manner that the graphics processing unit is able to process.

Additional features and advantages of one or more embodiments of the present disclosure will be set forth in the description below.

BRIEF DESCRIPTION OF THE DRAWINGS

Various embodiments will be described and explained with additional specificity and detail through the use of the accompanying drawings in which.

DETAILED DESCRIPTION

Figure 1:
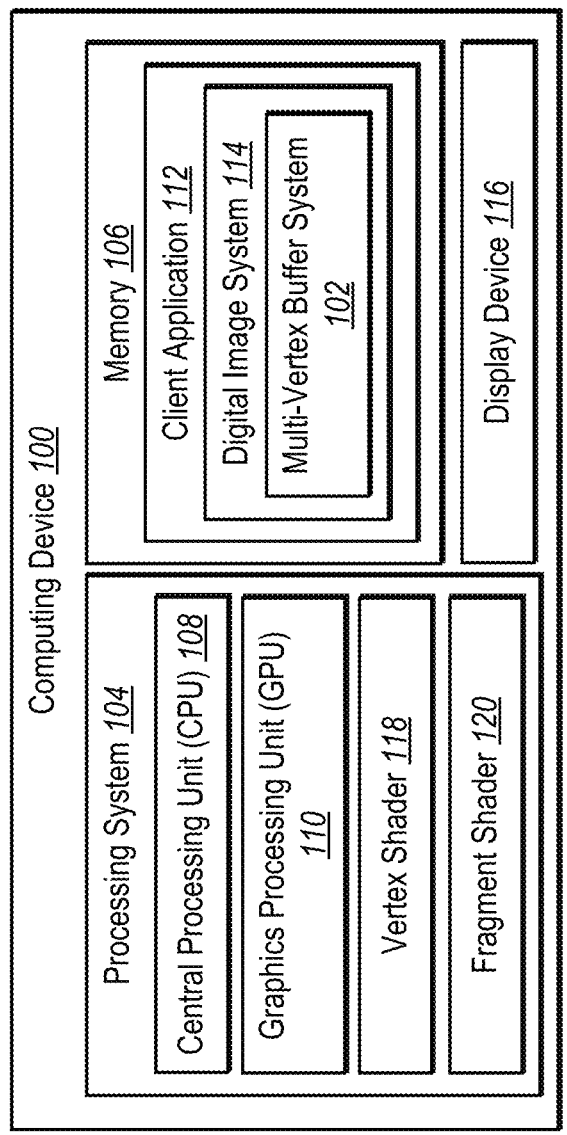
FIG. 1 illustrates an example system environment in which a multi-vertex buffer system operates in accordance with one or more implementations.

One or more embodiments of the present disclosure include a multi-vertex buffer system that generates compressed multi-vertex buffers for rendering two-dimensional vector graphics via a graphics processing unit. For instance, the multi-vertex buffer system can generate a compressed multi-vertex buffer that efficiently encodes locations and visual attributes for multiple vertices utilized to render two-dimensional vector graphics. In particular, the multi-vertex buffer system can encode vertex locations and visual attributes for multiple vertices within a single entry of a compressed multi-vertex buffer. By generating and processing the compressed multi-vertex buffer, the multi-vertex buffer system can more efficiently and flexibly render vector graphics while accurately providing resolution-independent anti-aliasing (without the need for a geometry shader).

To illustrate, in one or more embodiments, the multi-vertex buffer system utilizes a central processing unit to tessellate a two-dimensional vector graphic to generate triangles representing vector paths of the vector graphic. Additionally, the multi-vertex buffer system generates expanded geometries for control triangles within the tessellated geometry based on anti-aliasing directions associated with the control triangles. The multi-vertex buffer system then generates a compressed multi-vertex buffer including a multi-vertex buffer entry for each triangle in the tessellated geometry including vertex locations and attributes of the corresponding vector path. The multi-vertex buffer system also utilizes the data in the compressed multi-vertex buffer to render the vector graphic by passing data stored in the compressed multi-vertex buffer to the graphics processing unit in a plurality of draw calls (i.e., by expanding the compressed multi-vertex buffer). Thus, the multi-vertex buffer system efficiently stores rendering data for the vector graphic while still providing the rendering data to the graphics processing unit in a manner that the graphics processing unit is able to efficiently and accurately process.

As mentioned, in one or more embodiments the multi-vertex buffer system tessellates a two-dimensional vector graphic to generate a plurality of triangles representing vector paths of the vector graphic. For example, the multi-vertex buffer system first segments the two-dimensional vector graphic into a plurality of segments. In one or more embodiments, the multi-vertex buffer system segments cubic curves into monotonic quadratic segments. The multi-vertex buffer system then tessellates the vector segments into control triangles and interior triangles based on whether each triangle in the tessellated geometry includes a portion of a vector path or corresponds to an interior geometry of the vector graphic.

After tessellating vector paths of a two-dimensional vector graphic, in one or more embodiments the multi-vertex buffer system generates expanded geometries for control triangles of the tessellated geometry. Specifically, in one or more embodiments the multi-vertex buffer system determines an anti-alias direction associated with a vector path of a control triangle. Based on the anti-alias direction, the multi-vertex buffer system generates an expanded geometry for the control triangle in one or more directions corresponding to the anti-alias direction(s) (e.g., concave, convex) of the vector path.

Additionally, in one or more embodiments the multi-vertex buffer system determines vertex locations and visual attributes for each triangle in the tessellated geometry. For example, the multi-vertex buffer system determines vertex locations for triangles within expanded geometries of control triangles and for interior triangles. The multi-vertex buffer system also determines classifiers for each of the triangles indicating whether a triangle is a control triangle or an interior triangle and a stroke width (if the corresponding vector path includes a stroke). In one or more embodiments, the multi-vertex buffer system also determines a color for each vector path.

After determining the vertex locations and visual attributes of each triangle, in one or more embodiments the multi-vertex buffer system generates a compressed multi-vertex buffer for providing to a graphics processing unit. Specifically, in one or more embodiments, the multi-vertex buffer system generates a multi-vertex buffer entry for each triangle in the tessellated geometry. For example, the multi-vertex buffer system generates a multi-vertex buffer entry for interior triangles and each triangle within an expanded geometry corresponding to a control triangle. According to one or more embodiments, each compressed multi-vertex buffer entry include a set of vertex locations, a color, and one or more classifiers corresponding to each triangle from the tessellated geometry.

In one or more embodiments, when issuing a draw call to a graphics processing unit for executing a graphics pipeline, the multi-vertex buffer system expands the multi-vertex buffer entries to a format that the graphics processing unit understands. For example, the multi-vertex buffer system amplifies a vertex count based on a multi-vertex degree of the compressed multi-vertex buffer and then issues a plurality of draw calls to a vertex shader of the graphics processing unit according to the amplified vertex count. Amplifying the vertex count of the compressed multi-vertex buffer thus causes the multi-vertex buffer system to issue a number of draw calls equal to the number of vertices in the tessellated geometry while storing the rendering data in a compressed buffer. Finally, the multi-vertex buffer system utilizes parameters generated by the vertex shader of the graphics processing unit to render the vector graphic via a fragment shader of the graphics processing unit.

The disclosed multi-vertex buffer system can provide a number of technical advantages over conventional systems. For instance, the multi-vertex buffer system improves flexibility relative to conventional systems that render two-dimensional vector graphics. To illustrate, while some conventional systems utilize a rendering framework to render vector graphics via a rendering pipeline that includes a geometry shader, the multi-vertex buffer system utilizes a compressed multi-vertex buffer for rendering two-dimensional vector graphics without requiring a geometry shader. In one or more embodiments, by generating the compressed multi-vertex buffer, the multi-vertex buffer system vector graphics rendering for rendering frameworks that do not include a geometry shader. This is significant, inasmuch as some recently released technology frameworks do not include geometry shaders that can be accessed as part of the rendering pipeline. Accordingly, due to their rigid reliance on geometry shaders, many conventional systems are unable to operate with some of these recently released frameworks.

In addition to improving flexibility over conventional systems, the multi-vertex buffer system also improves efficiency relative to conventional systems. Specifically, by generating a compressed multi-vertex buffer to store rendering data for tessellated geometry, the multi-vertex buffer system stores less information than conventional systems that store per-vertex data in vertex buffers. Additionally, utilizing a compressed multi-vertex buffer improves the efficiency of the rendering pipeline by reducing the size of the buffer passed from a central processing unit to a graphics processing unit, and therefore, faster processing by the graphics processing unit. Indeed, the multi-vertex buffer system improves flexibility of computing systems that render two-dimensional vector graphics while improving computational efficiency and maintaining comparable rendering accuracy.

As illustrated by the foregoing discussion, the present disclosure utilizes a variety of terms to describe features and advantages of the multi-vertex buffer system. Additional detail is now provided regarding examples of such terms. For example, as used herein, the terms "two-dimensional vector graphic" and "vector graphic" refer to a two-dimensional digital image including one or more graphics defined by one or more vectors (e.g., mathematical curves and lines). A vector graphics includes one or more vector drawing segments that represent straight lines or curves. Because vector graphics employ mathematical equations to represent edges, rather than a grid of pixels, zooming in on a vector graphic does not cause aliasing or digital artifacts along edges of a drawing segment. Indeed, a vector image is resizable without losing quality in color or smoothness. Common examples of vector file formats include SVG, EPS, and PDF files.

As used herein, the term "vector path" refers to a continuous function that extends from an initial point to a terminal point. Specifically, a vector path includes one or more drawing segments (e.g., straight lines or curved lines) based on one or more sets of vector parameters. Additionally, one or more vector paths in a vector graphic define one or more shapes within the vector graphic, including strokes or boundaries of objects. In one or more embodiments, a path includes one or more Bezier curves and/or one or more straight lines. In other embodiments, a path includes other representations of curved/straight lines including Hermite curves, B-splines, non-uniform rational basis splines, Kappa-curves, Catmull-Rom splines or another parameter curve.

As used herein, the term "control triangle" refers to a triangle that represents at least a portion of a vector path in a geometry for a vector graphic. For example, a tessellation process generates a plurality of triangles representing a geometry of a vector graphic by triangulating one or more two-dimensional vector paths and/or an interior of the geometry into a plurality of triangles. Accordingly, a control triangle includes a triangle that a tessellation process has generated by triangulating a geometry of a two-dimensional vector path. Furthermore, as used herein, the term "interior triangle" refers to a triangle that represents an interior portion of a geometry for a vector graphic. In one or more embodiments, an interior triangle includes a portion enclosed by, but not including, one or more two-dimensional vector paths of a vector graphic.

As used herein, the term "expanded geometry" refers to a geometric shape that contains a control triangle and extends past a boundary of the control triangle for anti-aliasing a vector path corresponding to the control triangle. In one or more embodiments, an expanded geometry includes a rectangle containing a control triangle and extends past the control triangle in an anti-aliasing direction. Additionally, in one or more embodiments, an expanded geometry is represented by two triangles. For example, an expanded geometry includes a left triangle and a right triangle that form a rectangle encompassing a control triangle.

As used herein, the term "anti-aliasing direction" refers to a direction in which a rendering process anti-aliases a portion of a vector graphic. According to one or more embodiments, when performing resolution-independent rendering of a vector graphic, a graphics processing unit utilizes anti-aliasing to reduce or prevent visibly jagged lines between regions of color transition. Thus, with respect to a curved line, an anti-aliasing direction includes convex-side anti-aliasing, concave-side anti-aliasing, clockwise-side anti-aliasing, or anticlockwise-side anti-aliasing associated with a vector path.

As used herein, the term "vertex" refers to a point belonging to a primitive in a tessellated geometry. For example, a vertex includes a single point, an endpoint of a line, or a corner of a triangle. Additionally, as used herein, the term "vertex location" refers to a location of a vertex within a coordinate system. In one or more embodiments, a vertex location for a vertex in a tessellated geometry include coordinates relative to an origin point of a coordinate system (e.g., a two-dimensional coordinate system).

As used herein, the term "compressed multi-vertex buffer" refers to a memory buffer that includes rendering data for tessellated geometry of a two-dimensional vector graphic. For example, a compressed multi-vertex buffer includes a plurality of entries corresponding to a plurality of primitives for rendering via a graphics processing unit. To illustrate, a multi-vertex buffer includes rendering data for a plurality of primitives within a tessellated geometry. Accordingly, as used herein, the term "multi-vertex buffer entry" refers to a vector, array, matrix, or other digital representation that includes rendering data for a single primitive of a tessellated geometry that a GPU utilizes to render the single primitive. For example, a multi-vertex buffer entry includes a vector of a plurality of rendering values including a plurality of vertex locations for the triangle primitive, a color, and one or more classifiers. Additionally, in one or more embodiments, a visual representation of a compressed multi-vertex buffer includes a table comprising a plurality of rows, in which each row includes a separate vector for a multi-vertex buffer entry. Furthermore, in such embodiments, a column in the table corresponds to a specific type of value (e.g., a vertex location, a color, or a classifier) such that a multi-vertex buffer entry includes a single table row comprising all rendering values for a corresponding triangle within a plurality of columns of the row. In alternative embodiments, a table representation of a compressed multi-vertex buffer includes switching rows and columns (e.g., such that a single column corresponds to a multi-vertex buffer entry).

As used herein, the term "triangle vertex classifier" or "classifier" refers to an attribute of vertices associated with a primitive. For example, a classifier includes a primitive type and/or a stroke width of a vector path (if the primitive includes a stroke). In one or more embodiments, a primitive type includes an indicator of whether a particular primitive is an interior triangle, an exterior triangle, or a line. Additionally, in some embodiments, a classifier for a primitive type indicates an anti-aliasing direction for a corresponding primitive.

As used herein, the term "vertex shader" refers to a programmable stage in a rendering pipeline of a graphics processing unit for processing individual vertices of an input geometry. In one or more embodiments, a vertex shader runs once for each vertex in a geometry (e.g., a tessellated geometry for a vector graphic) passed to the graphics processing unit. Additionally, a vertex shader generates rendering parameters based on the input geometry for a subsequent stage of a rendering pipeline. For example, rendering parameters include texture coordinate data, barycentric coordinate data, and whether a vertex belongs to a line primitive or degenerate primitive.

As used herein, the term "fragment shader" refers to a programmable stage in a rendering pipeline of a graphics processing unit for rendering an input geometry on a display device. In particular, a fragment shader generates fragments from primitives in an input geometry that correspond to pixels in a frame buffer for rendering in pixel locations of a display device. A fragment shader thus utilizes parameters from a vertex shader to determine display values (e.g., color values) for displaying at each pixel location of the display device.

Additional detail will now be provided regarding the multi-vertex buffer system in relation to illustrative figures portraying exemplary implementations. To illustrate, FIG. 1 includes a computing device 100 on which a multi-vertex buffer system 102 operates in accordance with one or more embodiments. In particular, the computing device 100 includes a processing system 104 and memory 106. Moreover, as shown, the processing system 104 includes a central processing unit ("CPU 108") and a graphics processing unit ("GPU 110"). Additionally, the memory 106 includes a client application 112 (e.g., by storing one or more portions or instructions associated with the client application 112). FIG. 1 further illustrates that the client application 112 includes a digital image system 114, which further includes the multi-vertex buffer system 102.

In one or more embodiments, the computing device 100 utilizes the memory 106 to store data associated with computer program applications (e.g., the client application 112), which include instructions for executing by a processor (e.g., the CPU 108) via the processing system 104. For example, the memory 106 stores the client application 112 in response to an initial execution of the client application 112 via the CPU 108 on the processing system 104. In one or more embodiments, the client application 112 includes an application for presenting, generating, or editing digital images. For example, the client application 112 includes an application for presenting, generating, or editing two-dimensional vector graphics such as a PDF viewer/editor or an SVG viewer/editor.

As illustrated in FIG. 1, the client application 112 includes the digital image system 114. According to one or more embodiments, the digital image system 114 provides operations for presenting, generating, or editing digital images. For example, the digital image system 114 provides tools for interacting with digital images via the client application 112. In at least some embodiments, the digital image system 114 provides remote access to tools for interacting with digital images by way of a web interface such as in a web browser or other application that provides access to the tools via a network connection. Thus, in various embodiments, at least a portion of the digital image system 114 operates on the computing device 100 while at least another portion of the digital image system 114 operates on a remote device (e.g., one or more server devices). In another example, the digital image system 114 is hosted entirely on a separate device (or devices), and the computing device 100 accesses the tools for interacting with digital images by communicating with the separate device(s) via a network. For example, the computing device 100 obtains instructions for interacting with digital images (including rendering two-dimensional vector graphics) from the hosting device via a network and stores the instructions in the memory 106.

Furthermore, FIG. 1 illustrates that the digital image system 114 includes the multi-vertex buffer system 102. In one or more embodiments, the multi-vertex buffer system 102 provides operations for processing and rendering digital images on a display device 116. Specifically, the multi-vertex buffer system 102 prepares digital image data for rendering on the display device via a rendering pipeline. For example, the multi-vertex buffer system 102 generates a compressed multi-vertex buffer to compress rendering data associated with a two-dimensional vector graphic. The multi-vertex buffer system 102 then utilizes the compressed multi-vertex buffer to render the two-dimensional vector graphic on the display device 116.

In one or more embodiments, the multi-vertex buffer system 102 includes instructions that, when executed by the CPU 108, causes the computing device to process image data associated with a two-dimensional vector graphic. For example, the multi-vertex buffer system 102 utilizes the CPU 108 to tessellate vector paths of the two-dimensional vector graphic. Specifically, tessellating the vector paths of the two-dimensional vector graphic allow the multi-vertex buffer system 102 to represent the two-dimensional vector graphic in a format that the GPU 110 is able to process. For instance, the multi-vertex buffer system 102 tessellates the vector paths to represent the vector paths as primitives such as points, lines, and triangles.

Additionally, in one or more embodiments, the multi-vertex buffer system 102 utilizes the CPU 108 to generate a compressed multi-vertex buffer from a tessellated geometry. In particular, the compressed multi-vertex buffer includes a multi-vertex buffer entry for each primitive in the tessellated geometry for the two-dimensional vector graphic. For example, a multi-vertex buffer entry includes vertex locations and attributes of a corresponding vector path.

After generating the compressed multi-vertex buffer for the two-dimensional vector graphic, the multi-vertex buffer system 102 issues a plurality of draw calls to a vertex shader 118 of the GPU 110 based on the number of vertices stored in the compressed multi-vertex buffer to generate rendering parameters for the vertices. The multi-vertex buffer system 102 utilizes the parameters from the vertex shader 118 to rasterize the vector graphic and render the two-dimensional graphic via a fragment shader 120 of the GPU 110. The multi-vertex buffer system 102 thus utilizes the compressed multi-vertex buffer to efficiently render the two-dimensional vector graphic in a rendering pipeline via the GPU 110.

As mentioned, vector graphics provide high-quality rendering regardless of resolution of a display device 116. To achieve resolution-independent rendering of vector graphics, the multi-vertex buffer system 102 applies anti-aliasing to portions of the vector graphic based on the properties of the vector paths. Specifically, in one or more embodiments, the multi-vertex buffer system 102 utilizes anti-aliasing to remove a jagged appearance between color transition areas of a vector graphic. Accordingly, the multi-vertex buffer system 102 includes anti-aliasing data in the compressed multi-vertex buffer to apply to the vector paths in the rendering pipeline.

In one or more embodiments, the computing device 100 of FIG. 1 includes, but is not limited to, a mobile device (e.g., smartphone or tablet), a laptop, a desktop, including those explained below with reference to FIG. 10. Furthermore, although not shown in FIG. 1, in some embodiments, the computing device 100 is operated by a user (e.g., a user associated with the digital image system 114) to perform a variety of functions. In particular, the computing device 100 performs functions such as, but not limited to, accessing, viewing, and interacting with a variety of digital content (e.g., digital images). The computing device 100 also performs functions for generating, capturing, or accessing data to provide to the digital image system 114 and the multi-vertex buffer system 102 in connection with digital images and rendering images via the processing system 104. For example, the computing device 100 utilizes the memory 106 to communicate with the processing system 104 to provide information associated with a two-dimensional vector graphic and to render the two-dimensional vector graphic with anti-aliasing. Although FIG. 1 illustrates the computing device 100 includes a single CPU 108 and a single GPU 110 in the processing system 104, in computing device 100 can include any number of CPUs or GPUs.

Furthermore, in one or more embodiments, the display device 116 of FIG. 1 includes, but is not limited to, a monitor display for a desktop computer, a laptop display for a laptop computer, or a touchscreen display for a mobile device (e.g., a phone or tablet). For example, the display device 116 includes a device that displays information based on an output of a GPU rendering pipeline. Accordingly, the display device 116 displays graphical user interfaces for the client application 112 including two-dimensional vector graphics.

Furthermore, in various embodiments, the display device 116 includes one of a plurality of possible resolutions.

Figure 2:
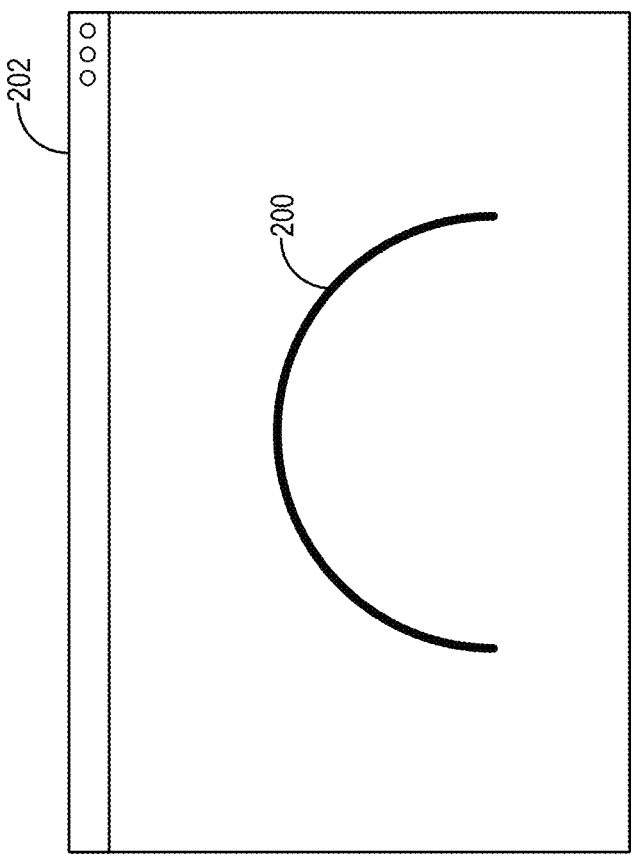
FIG. 2 illustrates a diagram of a vector path being rendered within a graphical user interface in accordance with one or more implementations.
Figure 2:
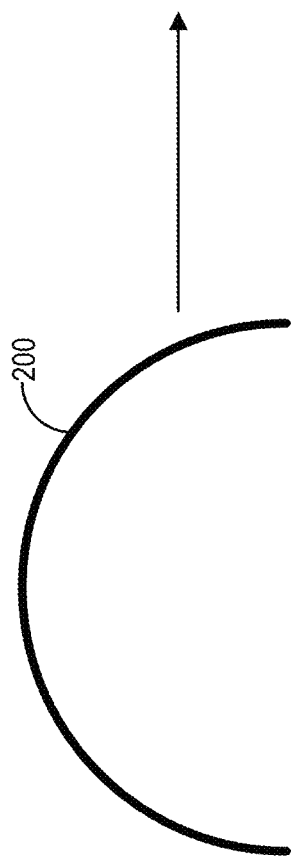

As mentioned above, the multi-vertex buffer system 102 flexibly and efficiently renders two-dimensional vector graphics by utilizing compressed multi-vertex buffers. FIG. 2 illustrates an example embodiment of the multi-vertex buffer system 102 rendering a two-dimensional vector graphic. Specifically, FIG. 2 illustrates that the multi-vertex buffer system 102 receives, as input, a two-dimensional vector graphic 200 including at least one vector path. FIG. 2 further illustrates that the multi-vertex buffer system 102 renders the two-dimensional vector graphic 200 within a graphical user interface 202.

In particular, as previously mentioned, the multi-vertex buffer system 102 generates a compressed multi-vertex buffer for rendering the two-dimensional vector graphic 200 within the graphical user interface 202. To generate the compressed multi-vertex buffer for the two-dimensional vector graphic 200, the multi-vertex buffer system 102 determines visual characteristics of vector paths in the two-dimensional vector graphic 200. For instance, the multi-vertex buffer system 102 determines color attributes, whether each vector path includes a stroke, endpoints of vector paths, and/or other visual characteristics that affect rendering of the two-dimensional vector graphic 200. The multi-vertex buffer system 102 utilizes the visual characteristics in the compressed multi-vertex buffer to render the two-dimensional vector graphic 200 via a GPU rendering pipeline.

In one or more embodiments, the multi-vertex buffer system 102 also renders the two-dimensional vector graphic 200 by utilizing anti-aliasing to provide smooth transitions along edges of the two-dimensional vector graphic 200. Specifically, as mentioned, the multi-vertex buffer system 102 determines anti-aliasing directions for vector paths in the two-dimensional vector graphic 200 based on the properties of each vector path. For instance, based on the properties of a vector path in the two-dimensional vector graphic 200 of FIG. 2, the multi-vertex buffer system 102 determines that the vector path includes a stroke path with anti-aliasing on both sides of the stroke path. The multi-vertex buffer system 102 thus determines that the vector path has clockwise or anti-clockwise anti-aliasing based on the direction of the vector path and includes the anti-aliasing information in the compressed multi-vertex buffer.

By applying anti-aliasing to the two-dimensional vector graphic 200 using the compressed multi-vertex buffer, the multi-vertex buffer system 102 provides flexible scaling of the two-dimensional vector graphic 200 without sacrificing visual fidelity on a display device. In particular, rather than merely using discrete pixels to represent curves in the two-dimensional vector graphic 200, which would otherwise result in a jagged appearance, the multi-vertex buffer system 102 smooths the jagged edges by averaging colors of pixels at the boundaries of color transitions along edges of vector paths. Accordingly, the compressed multi-vertex buffer allows the multi-vertex buffer system 102 to render the two-dimensional vector graphic at any resolution while efficiently storing and transmitting rendering data to the GPU.

Figure 3:
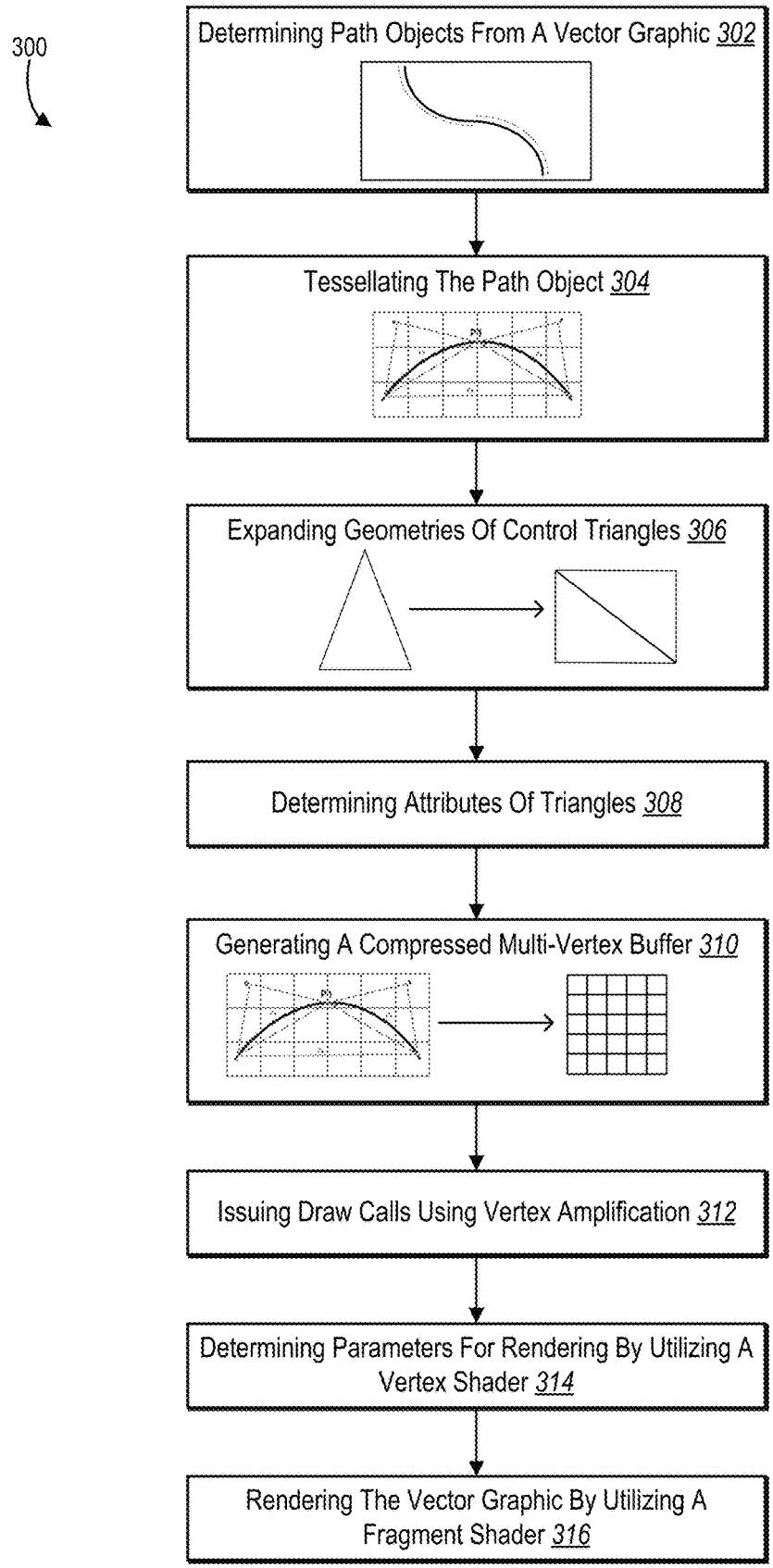
FIG. 3 illustrates a diagram of the multi-vertex buffer system preparing a two-dimensional graphic for a rendering pipeline in accordance with one or more implementations.

FIG. 3 illustrates an embodiment of a process for rendering a vector graphic using a compressed multi-vertex buffer in a GPU rendering pipeline. Specifically, FIG. 3 illustrates operations for preparing/processing data associated with the vector graphic by utilizing a CPU. In one or more embodiments, preparing the data associated with the vector graphic includes generating a compressed multi-vertex buffer. FIG. 3 then illustrates operations for providing the prepared data to a GPU rendering pipeline for rendering the vector graphic on a display device.

FIG. 3 illustrates that the multi-vertex buffer system 102 performs a series of acts 300, which includes an act 302 of determining path objects from a vector graphic. In particular, in one or more embodiments, the multi-vertex buffer system 102 analyzes image data for the vector graphic to identify one or more vector paths in the vector graphic. Additionally, in one or more embodiments, the multi-vertex buffer system 102 segments the vector path(s) into two-dimensional path objects to individually identify objects bounded by lines and curves. For instance, the multi-vertex buffer system 102 utilizes a segmentation algorithm to split cubic Bezier curves into monotonic quadratic Bezier segments.

FIG. 3 illustrates that the series of acts 300 also includes an act 304 of tessellating the path objects. Specifically, the multi-vertex buffer system 102 tessellates path objects by converting portions of the path objects into triangles utilizing a CPU of a computing device. For example, the multi-vertex buffer system 102 utilizes a tessellation algorithm to generate triangles that represent the monotonic quadratic Bezier segments obtained from the vector graphic based on segmenting curved paths of the identified path objects. By tessellating the path objects of the vector graphic, the multi-vertex buffer system 102 prepares the image data associated with the vector graphic for processing by a GPU of the computing device.

As also illustrated in FIG. 3, the series of acts 300 includes an act 306 of expanding geometries of control triangles. According to one or more embodiments, the multi-vertex buffer system 102 identifies control triangles in the tessellated geometry by identifying triangles that correspond to vector paths that the GPU will render with anti-aliasing. For example, the multi-vertex buffer system 102 determines that previously identified vector paths including monotonic quadratic Bezier segments each correspond to a control triangle in the tessellated geometry. Furthermore, in one or more embodiments, the multi-vertex buffer system 102 determines that triangles corresponding to portions of the vector graphic that do not include vector paths correspond to interior triangles.

After identifying control triangles in a vector graphic, the multi-vertex buffer system 102 generates expanded geometries for the control triangles. In particular, in one or more embodiments, the multi-vertex buffer system 102 generates a rectangle that encompasses a control triangle in an anti-aliasing direction for the corresponding vector path. For example, the multi-vertex buffer system 102 generates an expanded geometry that includes at least an area of the control triangle within an area of a generated triangle. Additionally, in one or more embodiments, the expanded geometry also includes an additional area beyond one or more vertices of the control triangle in the anti-aliasing direction. Furthermore, the multi-vertex buffer system 102 represents the expanded geometries of the control triangles by two triangles, such that the multi-vertex buffer system 102 utilizes two triangles to represent each control triangle.

FIG. 3 illustrates that the series of acts 300 also includes an act 308 of determining attributes of triangles in the tessellated geometry. Specifically, in one or more embodiments, the multi-vertex buffer system 102 determines visual attributes that affect rendering of the vector paths corresponding to the triangles. For example, the multi-vertex buffer system 102 identifies a color of a path object from the image data. In additional embodiments, the multi-vertex buffer system 102 also identifies classifiers associated with the triangles that indicate primitive types of the path objects and anti-aliasing directions. Furthermore, in at least some embodiments, the multi-vertex buffer system 102 also identifies classifiers indicating a stroke width for vector paths that include strokes.

Additionally, FIG. 3 illustrates that the series of acts 300 includes an act 310 of generating a compressed multi-vertex buffer. According to one or more embodiments, the multi-vertex buffer system 102 generates the compressed multi-vertex buffer by generating a separate multi-vertex buffer entry for each triangle from the tessellated geometry. For example, the multi-vertex buffer system 102 generates a multi-vertex buffer entry to include vertex locations and visual attributes (e.g., color, primitive type) for the triangle. In addition, because the multi-vertex buffer system 102 generates a multi-vertex buffer entry for each triangle, the multi-vertex buffer system generates an entry for each triangle in an expanded geometry corresponding to a control triangle. Thus, the compressed multi-vertex buffer includes two entries corresponding to each control triangle.

FIG. 3 further illustrates that the series of acts 300 includes an act 312 of issuing draw calls using vertex amplifications. Specifically, because each multi-vertex buffer entry in the compressed multi-vertex buffer includes a plurality of vertex locations corresponding to a particular triangle of a tessellated geometry, the number of entries in the compressed multi-vertex buffer does not equal the number of vertices in the tessellated geometry. Accordingly, the multi-vertex buffer system 102 expands the compressed multi-vertex buffer based on a multi-vertex degree of the compressed multi-vertex buffer, which indicates the number of separate vertex locations in each multi-vertex buffer entry. Thus, the multi-vertex buffer system 102 utilizes the expanded buffer to issue a number of draw calls equal to the total number of vertex locations within the tessellated geometry without losing the efficiency and flexibility benefits associated with the compressed multi-vertex buffer.

FIG. 3 also illustrates that the series of acts 300 includes an act 314 of determining parameters for rendering by utilizing a vertex shader. In one or more embodiments, the multi-vertex buffer system 102 issues a plurality of draw calls to the vertex shader of a GPU. For example, in response to the draw calls, the vertex shader generates rendering parameters for a vertex corresponding to the draw call. According to one or more embodiments, the rendering parameters for a particular vertex include texture information and rendering location information (e.g., for rasterizing the vector graphic). In additional embodiments, the rendering parameters include an indicator of whether a corresponding path object belongs to a line primitive or a degenerate primitive.

Additionally, FIG. 3 illustrates that the series of acts 300 includes an act 316 of rendering the vector graphic by utilizing a fragment shader. In particular, the multi-vertex buffer system 102 sends the rendering parameters generated by the vertex shader to a fragment shader of a GPU. In one or more embodiments, the multi-vertex buffer system 102 utilizes the fragment shader to determine the color and anti-aliasing corresponding to vector paths in the rasterized output displayed on a display device. To illustrate, the multi-vertex buffer system 102 uses the fragment shader of the GPU to determine color values for rendering each pixel on a display device based on the locations of path objects and anti-aliasing applied to the corresponding vector paths.

Figure 4A:
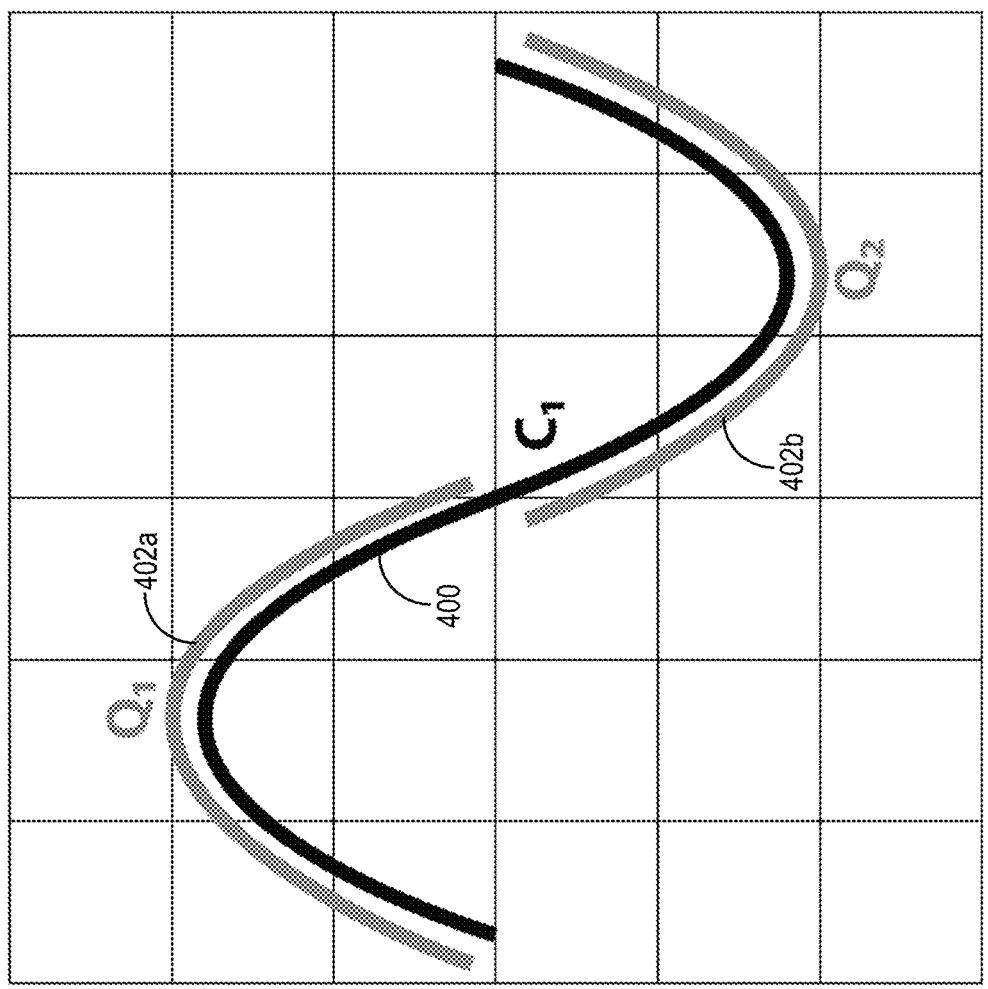
FIGS. 4A-4G illustrate diagrams of vector graphic data and rendering data in a vector graphic tessellation and rendering pipeline in accordance with one or more implementations.
Figure 4B:
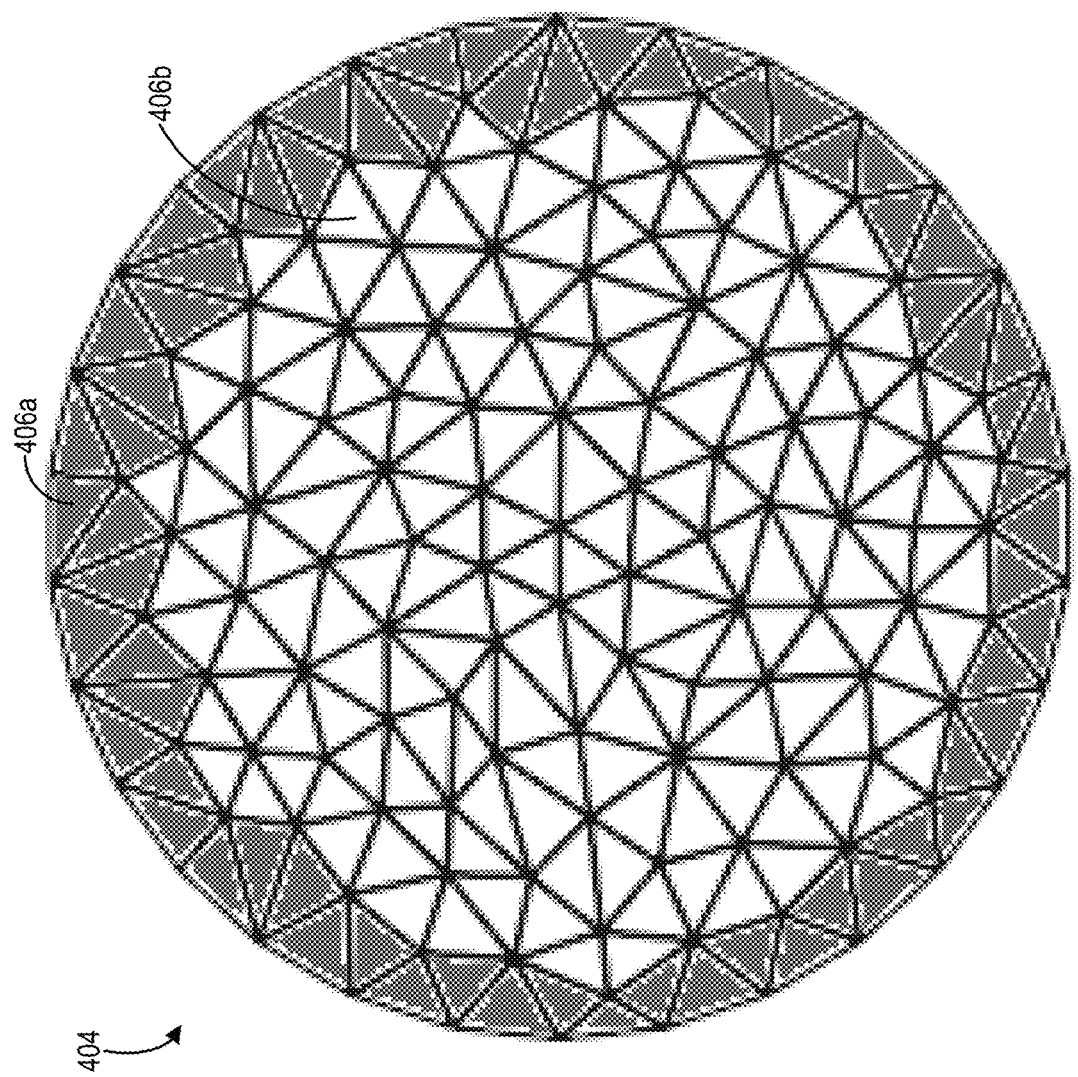

As described above, FIG. 3 illustrates an overview of a process of preparing data for a two-dimensional vector graphic and using the data in a GPU rendering pipeline to render the two-dimensional vector graphic. FIGS. 4A-4G illustrate additional detail for the process of preparing data for and rendering a two-dimensional vector graphic. Specifically, FIGS. 4A-4F illustrate embodiments of diagrams for processing image data of two-dimensional vector graphics including generating a compressed multi-vertex buffer. FIG. 4G illustrates an embodiment of a diagram for providing the processed image data in the compressed multi-vertex buffer to a GPU for rendering via the GPU rendering pipeline.

In one or more embodiments, the multi-vertex buffer system 102 prepares image data for a two-dimensional vector graphic by segmenting portions of the two-dimensional vector graphic into path objects. For example, FIG. 4A illustrates that the multi-vertex buffer system 102 segments a cubic curve 400 of a vector path into a plurality of separate path objects including distinct path segments. Specifically, in one or more embodiments, the multi-vertex buffer system 102 separates the cubic curve 400 into a first monotonic quadratic Bezier segment 402a and a second monotonic quadratic Bezier segment 402b. As illustrated, by segmenting cubic curves of a curved vector path into a plurality of separate quadratic splines, the multi-vertex buffer system 102 prepares the curved vector path for tessellation.

In one or more embodiments, segmenting cubic curves into quadratic curves provides segments that a tessellation algorithm triangulates into triangles. For example, FIG. 4B illustrates a tessellated geometry 404 of a Bezier curve forming an ellipse. To illustrate, the multi-vertex buffer system 102 utilizes a CPU to tessellate the Bezier curve by first segmenting the Bezier curve into a plurality of separate path objects, as described above with respect to FIG. 4A. In one or more embodiments, the multi-vertex buffer system 102 then utilizes a tessellation algorithm into a plurality of control triangles and a plurality of interior triangles based on whether each triangulated portion includes a portion of a vector path. For example, the multi-vertex buffer system 102 utilizes a Vatti clipping algorithm, as described by Bala R. Vatti in "A generic solution to polygon clipping" in Communications of the ACM, July 1992, which is herein incorporated by reference in its entirety. More specifically, the multi-vertex buffer system 102 utilizes the Vatti clipping algorithm (e.g., by polygon clipping) to generate the tessellated geometry 404 by producing interior triangles for path objects located in the interior of the vector path (e.g., inside the ellipse) and control triangles located along the vector path (e.g., along the exterior of the ellipse). As shown in FIG. 4B, the control polygons (e.g., control polygon 406a) are shaded and the interior polygons (e.g., interior polygon 406b) are not shaded. Although the above description utilizes the Vatti algorithm to generate the tessellated geometry 404, in one or more alternative embodiments, the multi-vertex buffer system 102 uses any known tessellation algorithm for triangulating two-dimensional geometries.

Figure 4C:
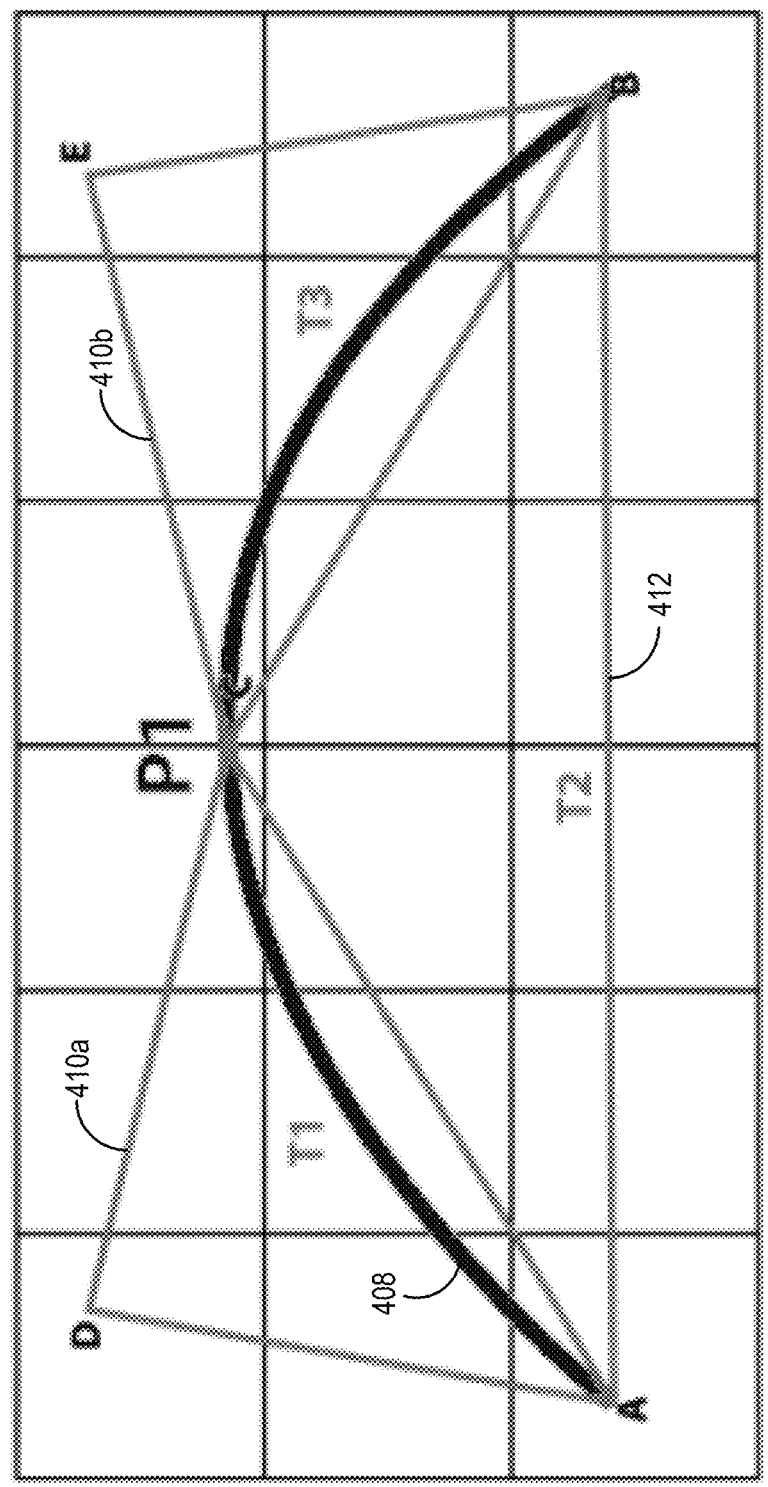

FIG. 4C illustrates a more detailed example of a tessellated geometry for a two-dimensional vector graphic. As shown, the multi-vertex buffer system 102 processes a vector path 408 including a curve to triangulate the vector path according to a tessellation algorithm. In one or more embodiments, the vector path 408 includes a quadratic Bezier curve. Additionally, when tessellating the vector path 408, the multi-vertex buffer system 102 generates a first control triangle 410a, a second control triangle 410b, and an interior triangle 412 to represent different portions of the vector graphic.

As illustrated in FIG. 4C, the first control triangle 410a includes a first portion of the vector path 408 and the second control triangle 410b includes a second portion of the vector path 408. Furthermore, the interior triangle 412 does not include any portion of the vector path 408. According to one or more embodiments, the multi-vertex buffer system 102 utilizes a tessellation algorithm that ensures no overlap of triangles in the tessellated geometry. In alternative embodiments, the multi-vertex buffer system 102 utilizes a tessellation algorithm that allows overlap of triangles in the tessellated geometry.

Figure 4D:
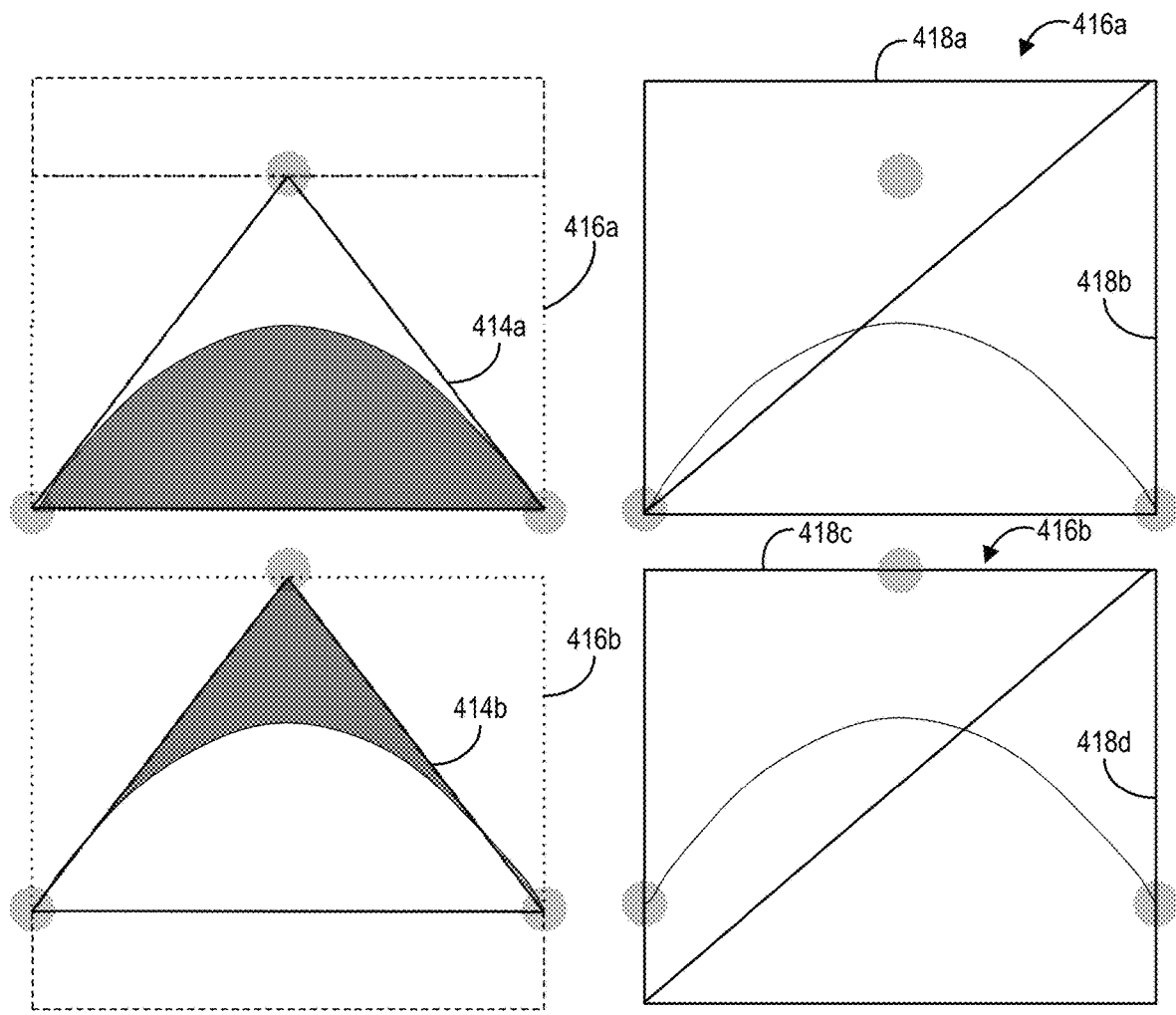

After tessellating one or more vector paths of a vector graphic into a plurality of triangles, the multi-vertex buffer system 102 generates expanded geometries of control triangles for applying anti-aliasing to the corresponding portions of the vector graphic in the GPU rendering pipeline. FIG. 4D illustrates a plurality of diagrams including expanded geometries for control triangles based on anti-aliasing directions of the corresponding vector paths. In particular, FIG. 4D illustrates expanded geometries based on anti-aliasing directions on different sides of vector paths according to color transitions in the corresponding path objects.

As shown in FIG. 4D, for example, a first control triangle 414a corresponds to a vector path with a concave-side fill. Accordingly, the multi-vertex buffer system 102 determines that the vector path has convex-side anti-aliasing (i.e., outside the curve of the vector path). Because the vector path has convex-side anti-aliasing, the multi-vertex buffer system 102 generates a first expanded geometry 416a (e.g., a rectangle) that encompasses the first control triangle 414a. Additionally, the multi-vertex buffer system 102 generates the first expanded geometry 416a to include an additional area that extends beyond (e.g., above) the first control triangle 414a in the anti-alias direction. By including the additional area within the first expanded geometry 416a, the multi-vertex buffer system 102 provides additional space for rendering the vector path with anti-aliasing in the convex-side anti-aliasing direction.

FIG. 4D also illustrates a second control triangle 414b corresponding to a vector path with a convex-side fill. Accordingly, the multi-vertex buffer system 102 determines that the vector path has concave-side anti-aliasing (i.e., inside the curve of the vector path). Because the vector path has concave-side anti-aliasing, the multi-vertex buffer system 102 generates a second expanded geometry 416b that encompasses the second control triangle 414b and also includes an additional area that extends beyond (e.g., below) the second control triangle 414b in the anti-alias direction. Thus, the second expanded geometry 416b includes additional space below the second control triangle 414b for rendering the vector path with anti-aliasing in the concave-side anti-aliasing direction.

Additionally, in one or more embodiments, the multi-vertex buffer system 102 processes lines/curves including anti-aliasing in both the concave-side direction and the convex-side direction. For example, for a vector path includes a curve/line with a stroke with no fill to either side of the vector path, the multi-vertex buffer system 102 determines that the vector path has anti-aliasing directions in both the convex and concave sides of the vector path. In one or more embodiments, the multi-vertex buffer system 102 generates an expanded geometry for such a vector path that encompasses the corresponding control triangle and expands beyond the control triangle in both anti-aliasing directions (e.g., above and below the control triangle) for rendering the vector path with anti-aliasing in both directions.

In one or more embodiments, to generate an expanded geometry for a control triangle, the multi-vertex buffer system 102 utilizes a CPU to generate two triangles. Specifically, the multi-vertex buffer system 102 first duplicates the control triangle. The multi-vertex buffer system 102 then modifies the vertex locations of the control triangle and the duplicate triangle to create the expanded geometry with four vertex locations (e.g., the triangles share two vertices). More specifically, the multi-vertex buffer system 102 modifies the vertex locations of a triangle by multiplying vertex locations by a transformation matrix dependent on a current resolution (e.g., zoom level) at which the GPU is rendering the path objects. The multi-vertex buffer system 102 then runs a geometry expansion algorithm on the transformed vertex locations. Additionally, the multi-vertex buffer system 102 determines the new vertex locations after geometry expansion by converting the vertex locations of the expanded geometry to the original coordinate space by multiplying the vertex locations with the inverse of the transformation matrix.

As shown in FIG. 4D, the first expanded geometry 416a includes triangles 418a, 418b, the second expanded geometry 416b includes triangles 418c, 418d, and the third expanded geometry 416c includes triangles 418e, 418f. FIG. 4D also illustrates that each of the expanded geometries encompasses the original vertices of the corresponding control triangles within an area of the expanded geometries. In one or more embodiments, the expanded geometries do not include one or more of the original vertices as vertex locations for the new triangles, depending on the anti-aliasing direction(s).

Figure 4E:
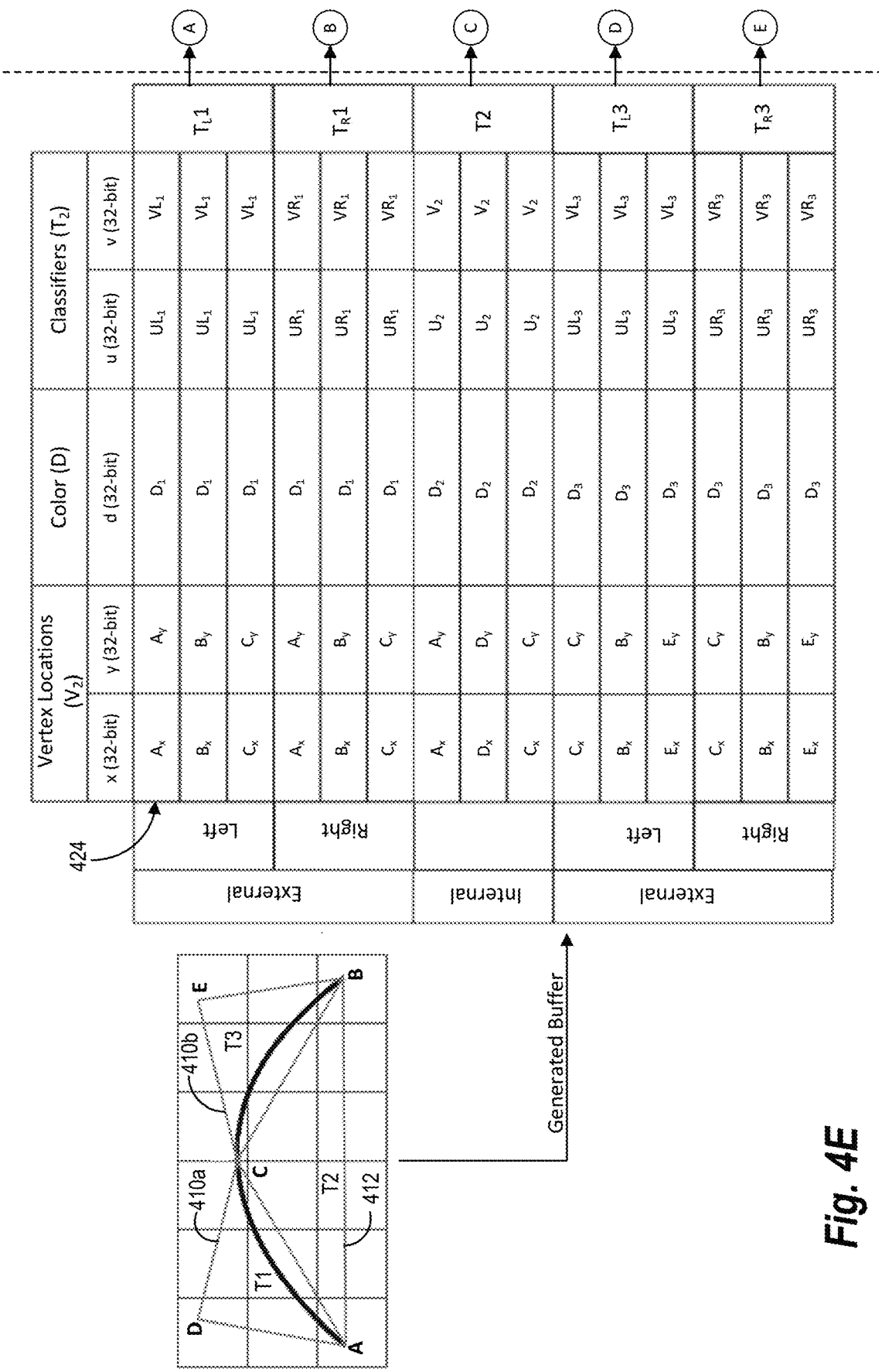
Figure 4F:
Figure 4G:
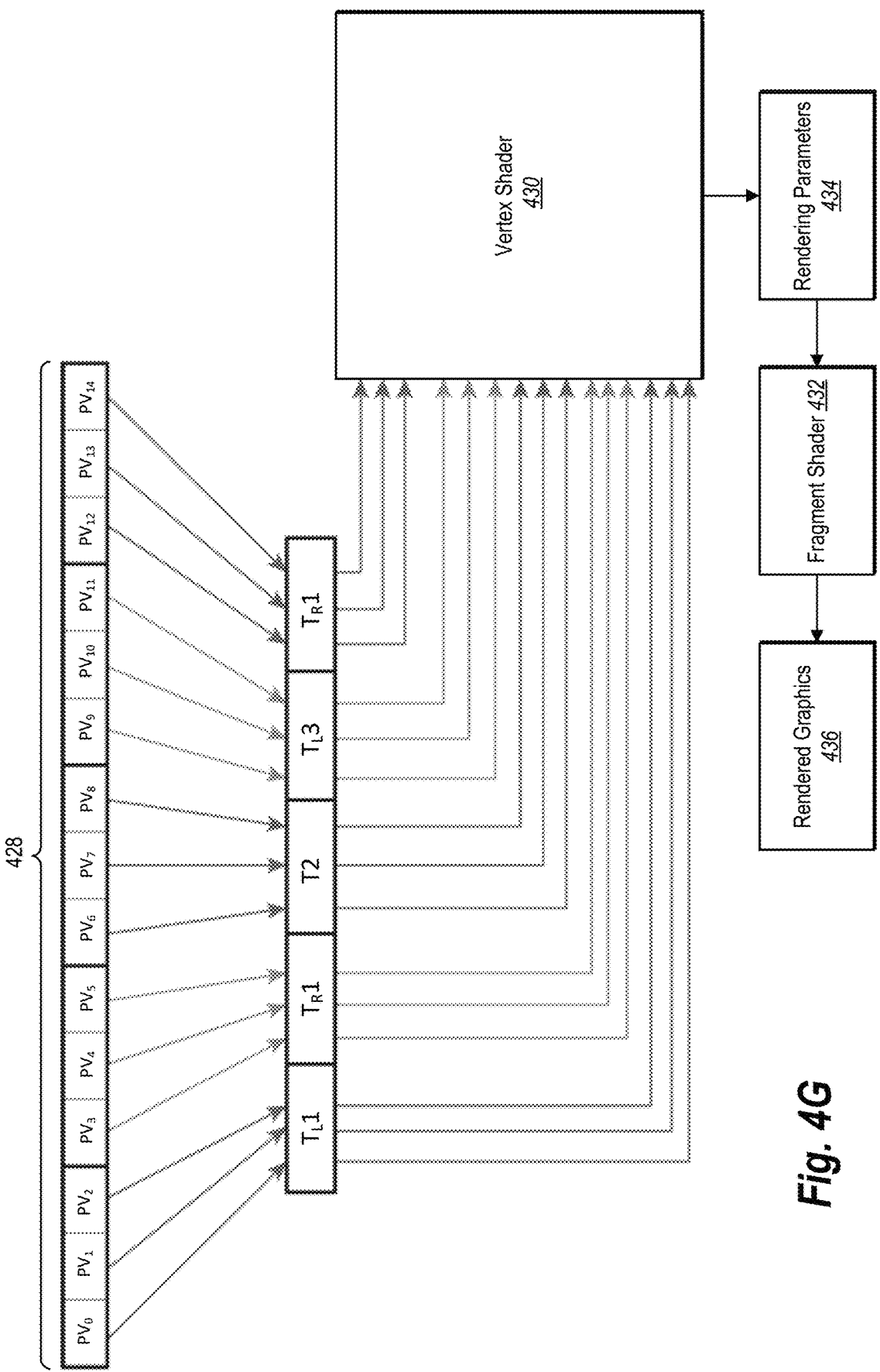

After generating expanded geometries for control triangles in a tessellated geometry, the multi-vertex buffer system 102 generates a compressed multi-vertex buffer to include rendering data for each triangle in the tessellated geometry. FIGS. 4E and 4F illustrate an overview of a process for generating a compressed multi-vertex buffer for the vector path of FIG. 4C. In particular, FIG. 4E illustrates a table 420 including rendering data for the triangles in the tessellated geometry in FIGS. 4C and 4D (e.g., expanded triangles for the first control triangle 410a, expanded triangles for the second control triangle 410b, and the interior triangle 412). FIG. 4F illustrates a compressed multi-vertex buffer 422 that the multi-vertex buffer system 102 generates including a plurality of entries with the rendering data for the triangles of the tessellated geometry of FIGS. 4C and 4D. Specifically, in one or more embodiments, while FIG. 4E illustrates the table 420 with the rendering data, the multi-vertex buffer system 102 generates the compressed multi-vertex buffer of FIG. 4F directly from the tessellated geometry without storing the rendering data in a separate (e.g., intermediate) data structure such as the table of FIG. 4E. Accordingly, in such embodiments, the table 420 of FIG. 4E is for descriptive purposes.

As previously described, the tessellated geometry of FIG. 4C includes two control triangles and an interior triangle. Accordingly, the multi-vertex buffer system 102 generates expanded geometries for the two control triangles, resulting in an additional triangle for each of the two control triangles (e.g., a left triangle and a right triangle for each control triangle). In one or more embodiments, the multi-vertex buffer system 102 determines rendering data for each of the triangles in the tessellated geometry, including additional triangles generated for expanded geometries. As shown in FIG. 4E, the multi-vertex buffer system 102 determines rendering data for "Left" and "Right" triangles corresponding to control (or "External") triangles and for "Internal" triangles.

FIG. 4E illustrates the table 420 including the rendering data for each of the triangles in a plurality of entries within the table 420. Specifically, each entry of the table 420 includes rendering data that the multi-vertex buffer system 102 identifies for each vertex of each of the triangles. For example, FIG. 4E illustrates that the multi-vertex buffer system 102 determines that the rendering data for a first vertex of a first triangle (shown as "$T_L1$" in FIG. 4E) included in a first entry 424 includes vertex coordinates ("$A_x$," "$A_y$"), a color ("$D_1$"), a classifier indicating the primitive type and anti-aliasing side ("$UL_1$"), and a classifier indicating a stroke width of the corresponding segment ("$VL_1$"). Similarly, the table 420 includes additional entries for each of the other vertices in the first triangle and for each of the other triangles in the tessellated geometry (including the additional triangles in the expanded geometries for control triangles).

Although the table 420 includes shorthand notation for the vertex coordinates (e.g., "$A_x$," "$A_y$") of each triangle, this notation is not intended to indicate the same vertex locations. To illustrate, FIG. 4E shows the "External Left" triangle having vertex locations $A_x$, $A_y$, $B_x$, $B_y$, $C_x$, and $C_y$, while the "External Right" triangle has vertex locations $A_x$, $A_y$, $B_x$, $B_y$, $C_x$, and $C_y$. As discussed above in FIG. 4D, the External Left and External Right triangles will generally not have the same vertices. Rather, they may share two vertices (and a unique third vertex). Thus, the notation of FIG. 4E is not intended to imply that all of the vertex locations are the same for the Left and Right triangles. Rather, the notation is included to illustrate how those vertices relate to the original control triangles 410a, 410b from which the expanded geometries are generated.

As mentioned, in one or more embodiments, the multi-vertex buffer system 102 determines vertex locations for vertices in triangles of a tessellated geometry. For instance, the vertex locations include coordinate positions within a coordinate system that a GPU utilizes to render on a display device. In one or more embodiments, the coordinate system includes an x-axis and a y-axis, such that the vertex locations are determined using an (x, y) format. Thus, for each triangle, the multi-vertex buffer system 102 determines three coordinate pairs within the coordinate system of the GPU rendering pipeline.

Furthermore, in one or more embodiments, the multi-vertex buffer system 102 determines the color of the vertex based on a color of the corresponding vector path or path object. For instance, in the embodiment of FIG. 4E, the multi-vertex buffer system 102 determines the color of the vector path of FIG. 4C. Additionally, the multi-vertex buffer system 102 assigns the color of the vector path to vertices of the corresponding triangle(s). To illustrate, the multi-vertex buffer system 102 assigns the color of the vector path to all of the vertices of the triangles in the expanded geometry corresponding to the vector path. For interior triangles, the multi-vertex buffer system 102 determines a fill color associated with a portion of the vector graphic to which an interior triangle corresponds and assigns the fill color to the interior triangle.

Additionally, in one or more embodiments, the multi-vertex buffer system 102 determines classifiers for each vertex indicating the primitive type and anti-aliasing direction for the corresponding vector path or portion of the vector graphic. For example, the classifier classifies a triangle as one of 1) an interior triangle, 2) a left exterior triangle with convex-side anti-aliasing, 3) a right exterior triangle with convex-side anti-aliasing, 4) a left exterior triangle with concave-side anti-aliasing, 5) a right exterior triangle with concave-side anti-aliasing, 6) a left triangle for a line with clockwise anti-aliasing, 7) a right triangle for a line with clockwise anti-aliasing, 8) a left triangle for a line with anti-clockwise anti-aliasing, or 9) a right triangle for a line with anti-clockwise anti-aliasing. Although the above examples indicate "left" or "right" triangles and "convex-side" or "concave-side" anti-aliasing, alternative embodiments utilize other notations for distinguishing triangles and anti-aliasing directions in expanded geometries for control triangles.

In one or more additional embodiments, the multi-vertex buffer system 102 determines classifiers for vector paths that include strokes. To illustrate, for a vector path including a line segment with a stroke, the multi-vertex buffer system 102 determines a stroke width for the line segment. For example, in FIG. 4E, the vector path includes a stroke. The multi-vertex buffer system 102 determines a stroke width for each of the vertices in the expanded geometries corresponding to the segments of the vector path including the stroke. In some embodiments, the multi-vertex buffer system 102 determines a null value or zero value for triangles corresponding to portions of the vector graphic that do not include a stroke (e.g., interior triangles or non-line primitive types).

As mentioned, the table 420 of FIG. 4E is for descriptive purposes. Accordingly, in connection with determining the vertex locations, color(s), and classifiers for vertices of triangles in a tessellated geometry, the multi-vertex buffer system 102 generates a compressed multi-vertex buffer including the identified data. FIG. 4F illustrates a compressed multi-vertex buffer 422 for the tessellated geometry of FIG. 4C. Specifically, the compressed multi-vertex buffer 422 of FIG. 4F includes a plurality of multi-vertex buffer entries corresponding to a plurality of triangles in the tessellated geometry of FIG. 4C.

FIG. 4F illustrates that the multi-vertex buffer system 102 generates the compressed multi-vertex buffer 422 by combining data for a triangle into a single multi-vertex buffer entry. Thus, instead of storing the data for each vertex in a per-vertex buffer entry, the multi-vertex buffer system 102 combines the data for a plurality of vertices of a triangle into a single multi-vertex buffer entry. Rather than generating a buffer that includes a number of entries equal to the number of vertices in the tessellated geometry (as in the table 424 of FIG. 4E), the multi-vertex buffer system 102 generates a buffer that includes a number of entries equal to the number of triangles in the tessellated geometry.

To illustrate, in the embodiment of FIG. 4F, the multi-vertex buffer system 102 generates a first multi-vertex buffer entry 426a corresponding to a left triangle of an expanded geometry for a control triangle and a second multi-vertex buffer entry 426b corresponding to a right triangle of the expanded geometry. In one or more embodiments, the storage format of the multi-vertex buffer entries includes the vertex locations (e.g., "$x_1$, $y_1$, $x_2$, $y_2$, $x_3$, $y_3$"), the color ("d"), and the classifiers ("u," "v,"). By storing the color and classifiers for each vertex of a single triangle within a single multi-vertex buffer entry, the multi-vertex buffer system 102 reduces the total stored data by storing the color and classifiers per-triangle instead of per-vertex because such values are the same for every vertex in the triangle.

More specifically, the multi-vertex buffer system 102 reduces the buffer size (e.g., number of buffer entries) used in conventional systems by $Size_{TB} = Size_{VB}/3$, where $Size_{TB}$ represents the buffer size of the compressed multi-vertex buffer 422 and $Size_{VB}$ represents the buffer size using conventional buffers (e.g., the table 424). Additionally, as illustrated, the multi-vertex buffer system 102 stores each vertex location (e.g., x-axis coordinate, y-axis coordinate, or (x, y) coordinate pair), color, and classifier in a separate column of the compressed multi-vertex buffer 422. Accordingly, each multi-vertex buffer entry includes a $V_6DT_2$ structure (6 vertices, 1 color, and 2 classifiers) stored as a single vertex in the compressed multi-vertex buffer. More specifically, a multi-vertex buffer entry includes a six-dimensional set of vertex locations for a triangle, a one-dimensional color value for the color of the vector path, and a two-dimensional classifier for classifiers of the triangle.

Additionally, in one or more embodiments, the multi-vertex buffer system 102 maps the vertex locations for tessellated geometry within multi-vertex buffer entries and within the compressed multi-vertex buffer according to a vertex rendering order associated with the triangles. In at least some embodiments, the multi-vertex buffer system 102 determines the vertex rendering order according to a rendering order for the corresponding vector paths. For example, the multi-vertex buffer system 102 stores vertex locations for a first triangle in the compressed multi-vertex buffer 422 in an order in which the multi-vertex buffer system 102 will issue draw calls to a vertex shader in the GPU rendering pipeline.

While storing the vertex data for tessellated geometry of a vector graphic in a compressed multi-vertex buffer reduces the storage requirements and data transferred between a CPU and a GPU at render time, the multi-vertex buffer system 102 utilizes the data from the compressed multi-vertex buffer in a manner that the GPU can process. Specifically, a GPU may not be able to natively understand the data stored in a compressed multi-vertex buffer. Thus, the multi-vertex buffer system 102 issues draw calls to the GPU using an amplified vertex count on the compressed multi-vertex buffer for executing the GPU rendering pipeline.

In one or more embodiments, the multi-vertex buffer system 102 prepares the compressed multi-vertex buffer for a GPU rendering pipeline by determining a number of draw calls for the GPU rendering pipeline. FIG. 4G illustrates that the multi-vertex buffer system 102 maps a plurality of pseudo vertices 428 to the compressed multi-vertex buffer for determining how to pass the data in the compressed multi-vertex buffer to a vertex shader 430 of a GPU. In one or more embodiments, the multi-vertex buffer system 102 maps the pseudo vertices 428 to the data in the multi-vertex buffer entries of the compressed multi-vertex buffer by maintaining a plurality of indices as the multi-vertex buffer system 102 processes the compressed multi-vertex buffer. To illustrate, the multi-vertex buffer system 102 maps the pseudo vertices 428 to vertex locations (and corresponding rendering data) in the compressed multi-vertex buffer using $T_{id}=V_{id}/3$, where $T_{id}$ represents the index of an input triangle in the compressed multi-vertex buffer, and $V_{id}$ represents the index of the vertex the GPU is processing.

More specifically, as illustrated in FIG. 4G, the multi-vertex buffer system 102 steps through the compressed multi-vertex buffer by incrementing the index of the vertex being processed until the GPU has processed all vertices of a triangle and pulling the corresponding data (e.g., color, classifiers) from the multi-vertex buffer entry for each processed vertex (e.g., for the mapped pseudo vertex). The multi-vertex buffer system 102 then increments the index of the input triangle and begins processing the vertices of the subsequent triangle in the order the vertex locations are stored in the compressed multi-vertex buffer. The multi-vertex buffer system 102 continues processing each vertex and triangle in order within the compressed multi-vertex buffer until the GPU has processed all of the vertices in the compressed multi-vertex buffer. Accordingly, due to the $V_6DT_2$ structure of each multi-vertex buffer entry, the multi-vertex buffer system 102 issues a number of draw calls equal to three times the number of entries in the compressed multi-vertex buffer. In the example of FIG. 4G, the multi-vertex buffer system 102 thus issues 15 draw calls based on the 5 multi-vertex buffer entries in the compressed multi-vertex buffer 422.

In one or more embodiments, the multi-vertex buffer system 102 processes the vertices in the compressed multi-vertex buffer by utilizing a GPU rendering pipeline. FIG. 4G also illustrates a simplified GPU pipeline including the vertex shader 430 and a fragment shader 432. In particular, FIG. 4G illustrates that the multi-vertex buffer system 102 utilizes the vertex shader 430 to generate a plurality of rendering parameters 434 for the vertices passed to the GPU via draw calls based on the compressed multi-vertex buffer. Additionally, the multi-vertex buffer system 102 utilizes the fragment shader to process the vertices based on the rendering parameters 434 and generate a rendered graphic 436 for presentation on a display device.

In one or more embodiments, the multi-vertex buffer system 102 utilizes the vertex shader 430 to generate the rendering parameters 434 including an anti-aliasing spread based on the triangles. Specifically, the multi-vertex buffer system 102 first utilizes the vertex shader 430 to compute texture coordinates for an input triangle. For example, the vertex shader 430 maps the vertices of the input triangle to texture coordinates (0.0, 0.0), (0.5, 0.0), (1.0, 1.0) for computing the convexity of the corresponding curve (e.g., quadratic Bezier curve). Because the new vertex locations are different than the original vertex locations (due to the expanded geometries), the multi-vertex buffer system 102 also generates new values of the texture coordinates using barycentric interpolation in two-dimensional space. In one or more embodiments, the multi-vertex buffer system 102 also utilizes the vertex shader 430 to generate barycentric coordinates for the vertices. To illustrates, the vertex shader 430 generates the barycentric coordinates at new vertex locations after generating expanded geometries for control triangles.

In additional embodiments, the multi-vertex buffer system 102 utilizes the vertex shader 530 to determine whether each vertex belongs to one of several primitive types. For instance, the vertex shader 430 determines whether each vertex belongs to a line primitive. In one or more embodiments, the multi-vertex buffer system 102 transforms point coordinates of a triangle to pixel space and then checks to determine if the three vertices for a triangle form a line at any resolution. In response to determining that the three vertices form a line at a resolution, the multi-vertex buffer system 102 determines that each of the vertices belongs to a line primitive at the identified resolution.

Furthermore, in one or more embodiments, the multi-vertex buffer system 102 utilizes the vertex shader 430 to determine whether each vertex belongs to a degenerate primitive. To illustrate, the vertex shader 430 transforms point coordinates of a triangle to a pixel space and then checks to determine if the three vertices form a zero-area primitive at any resolution. In response to determining that the three vertices form a zero-area primitive at a resolution, the multi-vertex buffer system 102 determines that each of the vertices belongs to a degenerate primitive at the identified resolution.

FIG. 4G illustrates that after the vertex shader 430 generates the rendering parameters 434 described above, the multi-vertex buffer system 102 passes the rendering parameters 434 to the fragment shader 432. For example, the multi-vertex buffer system 102 utilizes the fragment shader 432 in the GPU rendering pipeline to determine color values for rendering on a display device. To illustrate, the multi-vertex buffer system 102 utilizes the fragment shader 432 to generate a rendered graphic 436 by computing signed distance values of a plurality of fragments based on a rasterization of the vector graphic. The multi-vertex buffer system 102 further modulates the color values of the vector graphic and anti-aliasing from the curve based on the computed signed distance values. In one or more embodiments, the multi-vertex buffer system 102 utilizes the fragment shader 432 to generate the signed distance values from curves as described by Diego Nehab and Hugues Hoppe in "Random-Access Rendering of General Vector Graphics" in ACM Transactions on Graphics, 2008, which is herein incorporated by references in its entirety. It will be appreciated, however, that the multi-vertex buffer system 102 can utilize a variety of fragment shaders to generate rendered graphics. The multi-vertex buffer system 102 thus utilizes the compressed multi-vertex buffer in connection with the GPU rendering pipeline to display the rendered graphic 436 on a display device for efficient, accurate rendering of a two-dimensional vector graphic.

Figure 5B:
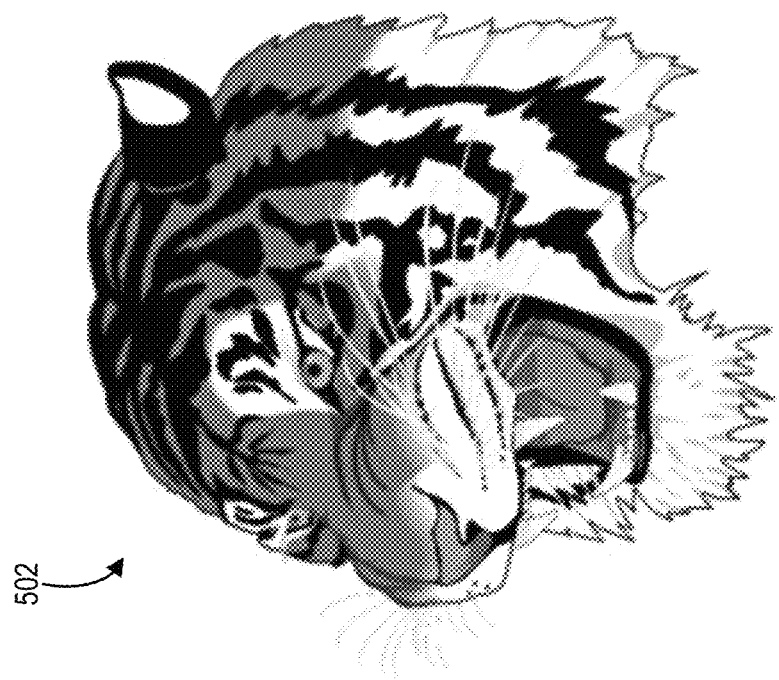
FIGS. 5A-5B illustrate renderings of a two-dimensional vector graphic in accordance with one or more implementations.
Figure 5A:
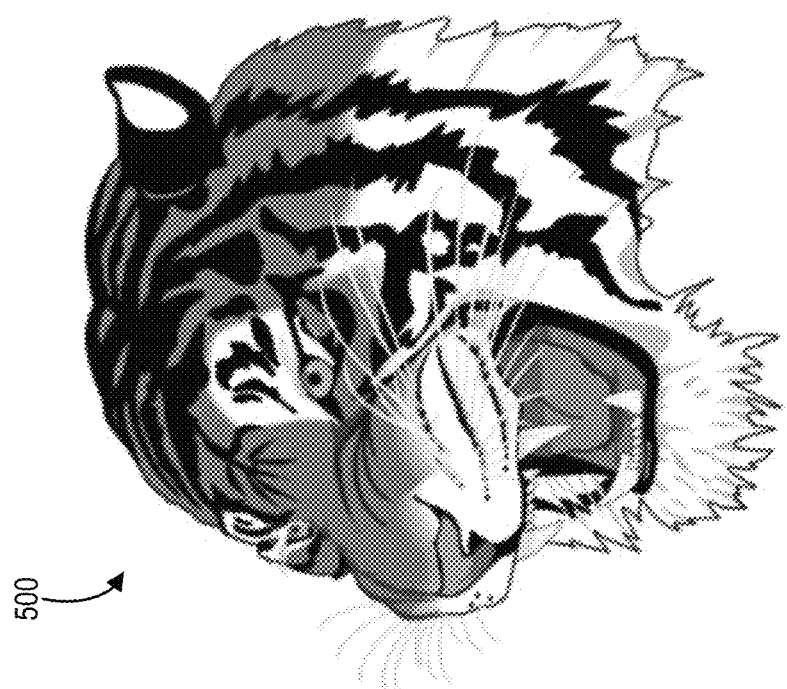

For example, FIGS. 5A-5B illustrate a plurality of two-dimensional vector graphics. Specifically, FIG. 5A illustrates a first rendered two-dimensional vector graphic 500 utilizing a conventional system with a GPU rendering pipeline that includes a geometric shader. FIG. 5B illustrates a second rendered two-dimensional vector graphic 502 utilizing the multi-vertex buffer system 102 with a compressed multi-vertex buffer. As shown, the multi-vertex buffer system 102 produces a rendered graphic with comparable accuracy to the conventional systems.

Additionally, by utilizing a compressed multi-vertex buffer to render two-dimensional vector graphics, the multi-vertex buffer system 102 produces improved performance relative to a conventional system that utilizes a geometric shader ("OpenGL"). As shown in the table below, the multi-vertex buffer system 102 produces comparable rendering quality while significantly improving benchmark performance when rendering a plurality of different vector graphics. In the table below, a lower benchmark value indicates better performance.

| Image | OpenGL | Multi-Vertex Buffer System | Gain |
|---|---|---|---|
| Graphic 1 | 85.01 | 54.93 | 1.547606044 |
| Graphic 2 | 31.63 | 18.59 | 1.701452394 |
| Graphic 3 | 40.86 | 24.31 | 1.680789798 |
| Graphic 4 | 309.31 | 219.89 | 1.406657874 |
| Graphic 5 | 284.87 | 141.73 | 2.009948494 |
| Graphic 6 | 81.96 | 54.92 | 1.492352513 |

In addition to improving benchmark performance, the multi-vertex buffer system 102 also results in lower memory usage by using a compressed multi-vertex buffer in a GPU rendering pipeline. Specifically, the compressed multi-vertex buffer optimizes vertex buffer storage, which also leads to reduced transfer time between the CPU and the GPU. Furthermore, the multi-vertex buffer system 102 is able to implement resolution-independent rendering of vector graphics independent of the GPU programming language, and is thus portable to mobile/web platforms by being universally applicable and does not rely on language-specific features such as geometry shaders.

As described in relation to FIGS. 3 and 4A-4G, the multi-vertex buffer system 102 performs operations for utilizing a compressed multi-vertex buffer to render two-dimensional vector graphics. The operations allow the multi-vertex buffer system 102 to flexibly and efficiently render two-dimensional vector graphics independent of resolution and GPU programming language. Accordingly, the acts and operations illustrated and described above in relation to FIGS. 3 and 4E-4F can provide the corresponding acts (e.g., structure) for a step for generating a compressed multi-vertex buffer based on the expanded geometry.

Figure 6:
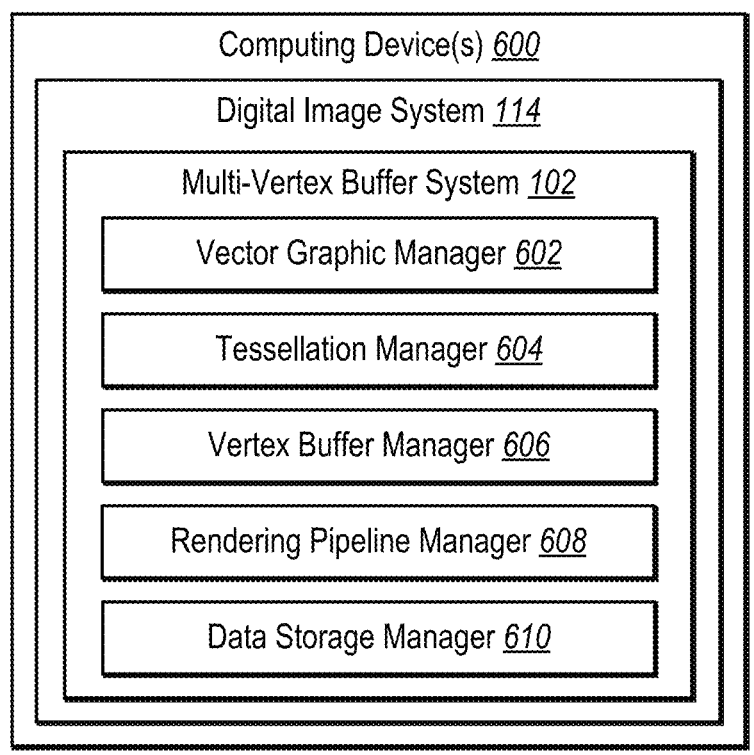
FIG. 6 illustrates a diagram of a computing device implementing the multi-vertex buffer system of FIG. 1 and corresponding components in accordance with one or more implementations.

FIG. 6 illustrates a detailed schematic diagram of an embodiment of the multi-vertex buffer system 102 described above. As shown, the multi-vertex buffer system 102 is implemented in a digital image system 114 on computing device(s) 600 (e.g., a client device and/or server device(s) as further described below in relation to FIG. 8). Additionally, in one or more embodiments, the multi-vertex buffer system 102 includes, but is not limited to, a vector graphic manager 602, a tessellation manager 604, a vertex buffer manager 606, a rendering pipeline manager 608, and a data storage manager 610. According to alternative embodiments, the multi-vertex buffer system 102 is implemented on any number of computing devices. For example, instead of implementing the multi-vertex buffer system 102 on a single computing device, as in FIG. 1, the multi-vertex buffer system 102 is implemented in a distributed system of server devices. To illustrate, the multi-vertex buffer system 102 provides instructions to a computing device that cause a CPU of the computing device to perform one or more operations associated with generating compressed multi-vertex buffers and rendering two-dimensional vector graphics.

In one or more embodiments, each of the components of the multi-vertex buffer system 102 is in communication with other components using any suitable communication technologies. Additionally, in some embodiments, the components of the multi-vertex buffer system 102 are in communication with one or more other devices including other computing devices of a user, server devices (e.g., cloud storage devices), licensing servers, or other devices/systems. It will be recognized that although the components of the multi-vertex buffer system 102 are shown to be separate in FIG. 6, any of the subcomponents may be combined into fewer components, such as into a single component, or divided into more components as may serve a particular implementation. Furthermore, although the components of FIG. 6 are described in connection with the multi-vertex buffer system 102, in one or more embodiments, at least some of the components for performing operations in conjunction with the multi-vertex buffer system 102 described herein are implemented on other devices within the environment.

In some embodiments, the components of the multi-vertex buffer system 102 include software, hardware, or both. For example, the components of the multi-vertex buffer system 102 include one or more instructions stored on a computer-readable storage medium and executable by processors of one or more computing devices (e.g., the computing device(s) 600). When executed by the one or more processors, the computer-executable instructions of the multi-vertex buffer system 102 can cause the computing device(s) 600 to perform the rendering operations described herein. Alternatively, the components of the multi-vertex buffer system 102 can include hardware, such as a special purpose processing device to perform a certain function or group of functions. Additionally, or alternatively, the components of the multi-vertex buffer system 102 can include a combination of computer-executable instructions and hardware.

Furthermore, the components of the multi-vertex buffer system 102 performing the functions described herein with respect to the multi-vertex buffer system 102 may, for example, be implemented as part of a stand-alone application, as a module of an application, as a plug-in for applications, as a library function or functions that may be called by other applications, and/or as a cloud-computing model. Thus, the components of the multi-vertex buffer system 102 may be implemented as part of a stand-alone application on a personal computing device or a mobile device. Alternatively, or additionally, the components of the multi-vertex buffer system 102 may be implemented in any application that provides three-dimensional image rendering, including, but not limited to ADOBE® ILLUSTRATOR®, ADOBE® ACROBAT®, or CREATIVE CLOUD® software. "ADOBE", "ILLUSTRATOR," "ACROBAT," AND "CREATIVE CLOUD" are either registered trademarks or trademarks of Adobe Inc. in the United States and/or other countries.

As mentioned above, FIG. 6 illustrates that the multi-vertex buffer system 102 includes a vector graphic manager 602. In one or more embodiments, the vector graphic manager 602 manages two-dimensional vector graphics for rendering via one or more client applications. For example, the vector graphic manager 602 manages image data for vector graphics associated with, but not limited to, SVG or PDF file types.

The multi-vertex buffer system 102 also includes a tessellation manager 604 to manage tessellation of vector paths within two-dimensional vector graphics. For instance, the tessellation manager 604 tessellates vector graphics into a plurality of triangles based on one or more vector paths of the vector graphics. Additionally, in one or more embodiments, the tessellation manager 604 expands geometries of control triangles in tessellated geometry based on anti-aliasing directions associated with vector paths of the vector graphics.

Additionally, the multi-vertex buffer system 102 includes a vertex buffer manager 606 to generate vertex buffers for rendering vector graphics. In particular, in one or more embodiments, the vertex buffer manager 606 generates compressed multi-vertex buffers for vector graphics by creating vertex buffers with multi-vertex buffer entries for triangles of tessellated geometries. In one or more embodiments, the vertex buffer manager 606 determines attributes of the vertices for storing in the multi-vertex buffer entries including color, primitive type, anti-aliasing direction, and stroke width (if applicable).

The multi-vertex buffer system 102 also includes a rendering pipeline manager 608 to render two-dimensional vector graphics via a GPU rendering pipeline using compressed multi-vertex buffers for the vector graphics. For example, the rendering pipeline manager 608 issues draw calls to a vertex shader in a GPU rendering pipeline based on a compressed multi-vertex buffer for a two-dimensional vector graphic. Additionally, the rendering pipeline manager 608 utilizes rendering parameters from the vertex shader to rasterize the two-dimensional vector graphic and then render the two-dimensional vector graphic via a fragment shader in the GPU rendering pipeline.

In one or more embodiments, the multi-vertex buffer system 102 includes a data storage manager 610 (that comprises a non-transitory computer memory/one or more memory devices) that stores and maintains data associated with rendering two-dimensional vector graphics. For example, the data storage manager 610 stores two-dimensional vector graphics including image data indicating one or more vector paths. The data storage manager 610 also stores rendering data for rendering two-dimensional vector graphics including, but not limited to, tessellated geometries, and compressed multi-vertex buffers.

Figure 7:
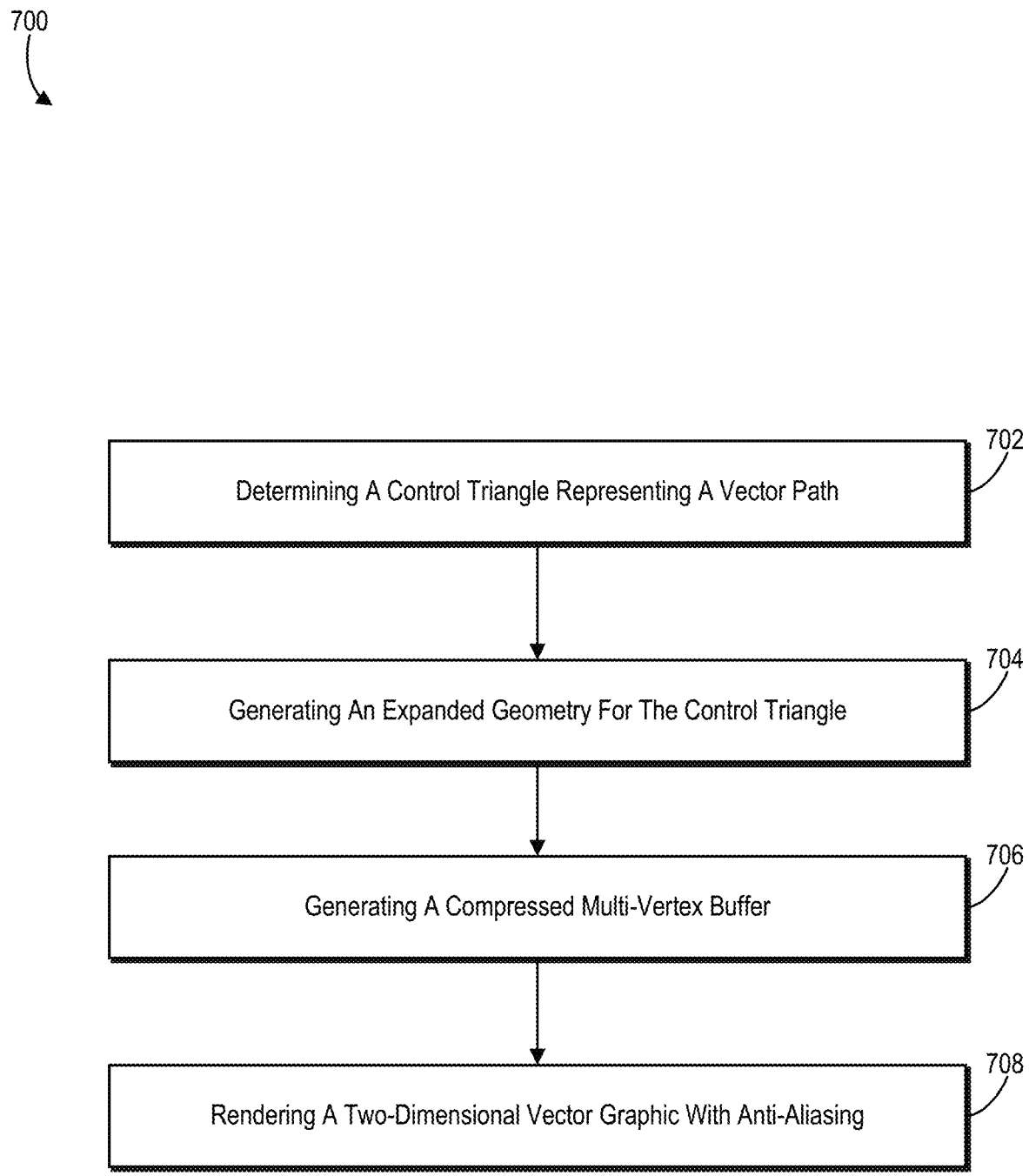
FIG. 7 illustrates a flowchart of a series of acts for generating a compressed multi-vertex buffer for rendering a two-dimensional vector graphic in accordance with one or more implementations.

Turning now to FIG. 7, this figure shows a flowchart of a series of acts 700 of rendering two-dimensional vector graphics by utilizing a compressed multi-vertex buffer. While FIG. 7 illustrates acts according to one embodiment, alternative embodiments may omit, add to, reorder, and/or modify any of the acts shown in FIG. 7. The acts of FIG. 7 can be performed as part of a method. Alternatively, a non-transitory computer readable medium can comprise instructions, that when executed by one or more processors, cause a computing device to perform the acts of FIG. 7. In still further embodiments, a system can perform the acts of FIG. 7.

As shown, the series of acts 700 includes an act 702 of determining a control triangle representing a vector path. For example, act 702 involves determining a control triangle representing a vector path in a two-dimensional vector graphic. In one or more embodiments, act 702 involves tessellating the two-dimensional vector graphic to generate a tessellated geometry including control triangles and interior triangles based on whether each tessellated portion of the two-dimensional vector graphic includes at least a portion of a vector path.

The series of acts 700 also includes an act 704 of generating an expanded geometry for the control triangle. For example, act 704 involves generating an expanded geometry for the control triangle according to an anti-aliasing direction for the vector path, the expanded geometry comprising a first triangle and a second triangle based on the control triangle. According to one or more embodiments, act 704 involves generating, for the control triangle, a rectangle that encompasses the control triangle based on an anti-aliasing direction for the vector path.

For example, act 704 involves determining the control triangle and a color representing the vector path in the two-dimensional vector graphic by determining whether an anti-aliasing direction for the vector path is on a convex side or a concave side of the vector path. In one or more embodiments, act 704 then involves generating the expanded geometry for the control triangle in a concave direction or a convex direction of the vector path based on the anti-aliasing direction. Additionally, in one or more embodiments, act 704 involves generating first triangle and the second triangle in the expanded geometry by duplicating the control triangle and then modifying vertex locations of the control triangle and duplicated control triangle to fit an area of the expanded geometry.

Furthermore, in one or more embodiments, act 704 involves determining, for the first triangle, a first set of vertex locations and a first triangle vertex classifier comprising a first identifier of the first triangle and the anti-aliasing direction for the vector path. Additionally, in one or more embodiments, act 704 involves determining, for the second triangle, a second set of vertex locations and a second triangle vertex classifier comprising a second identifier of the second triangle and the anti-aliasing direction for the vector path.

In one or more embodiments, act 704 involves transforming vertex locations of the control triangle from an original space to a pixel space by utilizing a transformation matrix based on rendering data for rendering the two-dimensional vector graphic. Additionally, act 704 then involves determining a rectangle that encloses the triangle. In one or more embodiments, act 704 involves expanding the rectangle in a direction corresponding to the anti-aliasing direction, wherein the expanded rectangle comprises the first triangle and the second triangle and then transforming vertex locations of the expanded rectangle from the pixel space to the original space according to the transformation matrix.

According to one or more additional embodiments, act 704 involves determining, for the control triangle, texture coordinates by mapping vertex locations of vertices in the control triangle to a texture space. Furthermore, act 704 also involves determining barycentric coordinates of the vertices of the first triangle and the vertices of the second triangle from the expanded geometry by utilizing a geometry spread algorithm. According to one or more embodiments, act 704 involves transforming the vertex locations for vertices in the first triangle and the vertex locations for vertices in the second triangle to a pixel space. In additional embodiments, act 704 involves determining whether each vertex of the vertices in the first triangle and of the vertices in the second triangle corresponds to a line primitive or a degenerate primitive at one or more rendering resolutions.

Additionally, the series of acts 700 includes an act 706 of generating a compressed multi-vertex buffer. For example, act 706 involves generating a first multi-vertex buffer entry comprising vertex locations for vertices in the first triangle and a second multi-vertex buffer entry comprising vertex locations for vertices in the second triangle. In some embodiments, act 706 involves generating a plurality of multi-vertex buffer entries comprising sets of vertex locations, vertex classifiers, and a color.

In one or more embodiments, act 706 involves generating the first multi-vertex buffer entry comprising the vertex locations for the vertices in the first triangle, the first triangle vertex classifier, and a color of the vector path. For instance, act 706 involves inserting each vertex location of the first set of vertex locations into a separate column within a row corresponding to the first multi-vertex buffer entry. In additional embodiments, act 706 involves generating the second multi-vertex buffer entry comprising the vertex locations for the vertices in the second triangle, the second triangle vertex classifier, and the color of the vector path. To illustrate, act 706 involves generating the second multi-vertex buffer entry by inserting each vertex location of the second set of vertex locations into a separate column within an additional row corresponding to the second multi-vertex buffer entry.

In one or more embodiments, act 706 also involves storing vertex locations in the first set of vertex locations within the first multi-vertex buffer entry and vertex locations in the second set of vertex locations within the second multi-vertex buffer entry to the compressed multi-vertex buffer according to a vertex rendering order associated with the first triangle and the second triangle within the compressed multi-vertex buffer.

According to one or more embodiments, act 706 involves generating the first-multi-vertex buffer entry by determining a six-dimensional set of vertex locations comprising the first set of vertex locations for the first triangle, a one-dimensional color value comprising the color representing the vector path, and a two-dimensional classifier comprising the first triangle vertex classifier and a stroke classifier indicating a stroke width of the vector path.

Furthermore, the series of acts 700 includes an act 708 of rendering a two-dimensional vector graphic with anti-aliasing. For example, act 708 involves rendering the two-dimensional vector graphic with anti-aliasing for the vector path by processing the first multi-vertex buffer entry and the second multi-vertex buffer entry via a graphics processing unit. In one or more embodiments, act 708 involves determining a multi-vertex degree of the compressed multi-vertex buffer according to a vertex count within each entry of the compressed multi-vertex buffer. Act 708 then involves sending, to the graphics processing unit, a number of draw calls corresponding to the vertex count for the first multi-vertex buffer entry based on the multi-vertex degree of the compressed multi-vertex buffer.

For example, act 708 involves sending a plurality of draw calls to a vertex shader of the graphics processing unit based on the vertex count. In one or more embodiments, act 708 involves determining, for processing the first triangle via the vertex shader, a triangle index corresponding to the first triangle. Act 708 then involves determining, for processing the first set of vertex locations of the first triangle via the vertex shader, a set of vertex indices by expanding the first set of vertex locations from the first multi-vertex buffer entry according to a number of vertex locations within the first multi-vertex buffer entry. Additionally, act 708 involves sending a plurality of draw calls to the vertex shader of the graphics processing unit to process the first set of vertex locations according to the set of vertex indices.

In one or more embodiments, act 708 also involves determining, for processing the second triangle via the vertex shader, an additional triangle index corresponding to the second triangle. Act 708 also involves determining, for processing the second set of vertex locations of the second triangle via the vertex shader, an additional set of vertex indices by expanding the second set of vertex locations from the second multi-vertex buffer entry according to a number of vertex locations within the second multi-vertex buffer entry. Additionally, act 708 involves sending an additional plurality of draw calls to the vertex shader of the graphics processing unit to process the second set of vertex locations according to the additional set of vertex indices.

In one or more embodiments, act 708 involves determining, via the vertex shader, a plurality of parameters associated with texture coordinates and barycentric position coordinates of the first triangle and the second triangle by utilizing the first multi-vertex buffer entry and the second multi-vertex buffer entry. Act 708 also involves rendering the two-dimensional vector graphic with anti-aliasing for the vector path by providing the plurality of parameters to a fragment shader of the graphics processing unit.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
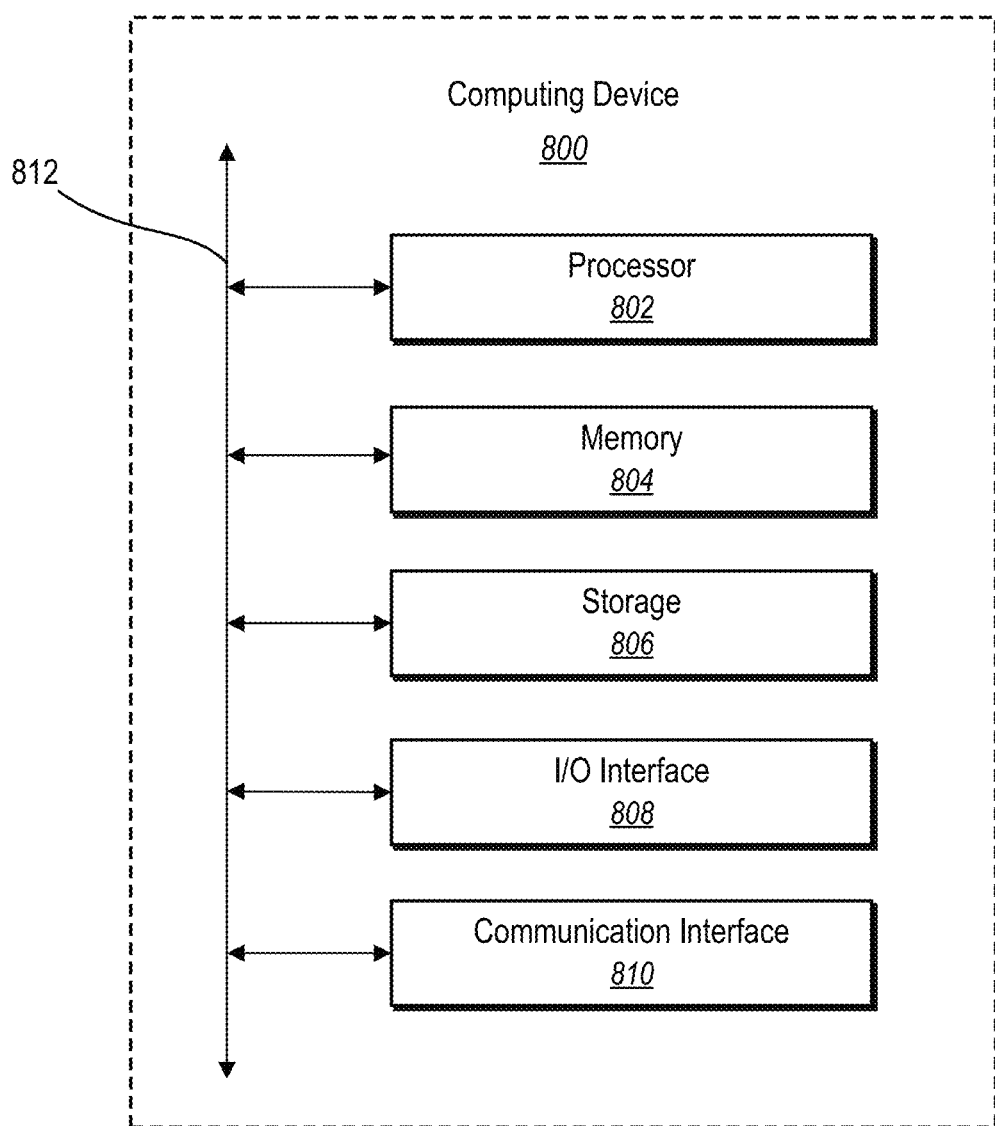
FIG. 8 illustrates a block diagram of an exemplary computing device in accordance with one or more embodiments.

FIG. 8 illustrates a block diagram of exemplary computing device 800 that may be configured to perform one or more of the processes described above. One will appreciate that one or more computing devices such as the computing device 800 may implement the system(s) of FIG. 1. As shown by FIG. 8, the computing device 800 can comprise a processor 802, a memory 804, a storage device 806, an I/O interface 808, and a communication interface 810, which may be communicatively coupled by way of a communication infrastructure 812. In certain embodiments, the computing device 800 can include fewer or more components than those shown in FIG. 8. Components of the computing device 800 shown in FIG. 8 will now be described in additional detail.

In one or more embodiments, the processor 802 includes hardware for executing instructions, such as those making up a computer program. As an example, and not by way of limitation, to execute instructions for dynamically modifying workflows, the processor 802 may retrieve (or fetch) the instructions from an internal register, an internal cache, the memory 804, or the storage device 806 and decode and execute them. The memory 804 may be a volatile or non-volatile memory used for storing data, metadata, and programs for execution by the processor(s). The storage device 806 includes storage, such as a hard disk, flash disk drive, or other digital storage device, for storing data or instructions for performing the methods described herein.

The I/O interface 808 allows a user to provide input to, receive output from, and otherwise transfer data to and receive data from computing device 800. The I/O interface 808 may include a mouse, a keypad or a keyboard, a touch screen, a camera, an optical scanner, network interface, modem, other known I/O devices or a combination of such I/O interfaces. The I/O interface 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data may be representative of one or more graphical user interfaces and/or any other graphical content as may serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example, and not by way of limitation, the communication interface 810 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 810 may facilitate communications with various types of wired or wireless networks. The communication interface 810 may also facilitate communications using various communication protocols. The communication infrastructure 812 may also include hardware, software, or both that couples components of the computing device 800 to each other. For example, the communication interface 810 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A non-transitory computer readable storage medium comprising instructions that, when executed by at least one processor, cause a computing device to:
   determine a control triangle representing a vector path in a two-dimensional vector graphic;
   generate an expanded geometry for the control triangle according to an anti-aliasing direction for the vector path by:
      generating an expanded rectangle that encloses the control triangle and extends beyond an enclosing rectangle corresponding to the control triangle in the anti-aliasing direction; and
      determining, within the expanded rectangle, a first triangle and a second triangle based on vertices of the expanded rectangle;
   generate a first multi-vertex buffer entry comprising vertex locations for vertices in the first triangle by combining per-vertex data for the vertices in the first triangle into the first multi-vertex buffer entry and a second multi-vertex buffer entry comprising vertex locations for vertices in the second triangle by combining per-vertex data for the vertices in the second triangle into the second multi-vertex buffer entry; and
   render the two-dimensional vector graphic with anti-aliasing for the vector path by processing the first multi-vertex buffer entry and the second multi-vertex buffer entry via a graphics processing unit.

2. The non-transitory computer readable storage medium as in claim 1, further comprising instructions that, when executed by the at least one processor, cause the computing device to:
   determine, for the first triangle, a first set of vertex locations and a first triangle vertex classifier comprising a first identifier of the first triangle and the anti-aliasing direction for the vector path; and
   determine, for the second triangle, a second set of vertex locations and a second triangle vertex classifier comprising a second identifier of the second triangle and the anti-aliasing direction for the vector path.

3. The non-transitory computer readable storage medium as in claim 2, further comprising instructions that, when executed by the at least one processor, cause the computing device to generate a compressed multi-vertex buffer comprising the first multi-vertex buffer entry and the second multi-vertex buffer entry by:
   generating the first multi-vertex buffer entry from the per-vertex data for the vertices in the first triangle comprising the vertex locations for the vertices in the first triangle, the first triangle vertex classifier, and a color of the vector path; and
   generating the second multi-vertex buffer entry from the per-vertex data for the vertices in the second triangle comprising the vertex locations for the vertices in the second triangle, the second triangle vertex classifier, and the color of the vector path.

4. The non-transitory computer readable storage medium as in claim 3, further comprising instructions that, when executed by the at least one processor, cause the computing device to generate the compressed multi-vertex buffer by storing vertex locations in the first set of vertex locations within the first multi-vertex buffer entry and vertex locations in the second set of vertex locations within the second multi-vertex buffer entry to the compressed multi-vertex buffer according to a vertex rendering order associated with the first triangle and the second triangle within the compressed multi-vertex buffer.

5. The non-transitory computer readable storage medium as in claim 4, further comprising instructions that, when executed by the at least one processor, cause the computing device to:
generate the first multi-vertex buffer entry by inserting each vertex location of the first set of vertex locations into a separate column within a row corresponding to the first multi-vertex buffer entry; and
generate the second multi-vertex buffer entry by inserting each vertex location of the second set of vertex locations into a separate column within an additional row corresponding to the second multi-vertex buffer entry.

6. The non-transitory computer readable storage medium as in claim 1, further comprising instructions that, when executed by the at least one processor, cause the computing device to render the two-dimensional vector graphic by:
determining a multi-vertex degree of a compressed multi-vertex buffer according to a vertex count within each entry of the compressed multi-vertex buffer; and
sending, to the graphics processing unit, a number of draw calls corresponding to the vertex count for the first multi-vertex buffer entry based on the multi-vertex degree of the compressed multi-vertex buffer.

7. The non-transitory computer readable storage medium as in claim 1, further comprising instructions that, when executed by the at least one processor, cause the computing device to generate the expanded geometry for the control triangle according to the anti-aliasing direction for the vector path by:
transforming vertex locations of the control triangle from an original space to a pixel space by utilizing a transformation matrix based on rendering data for rendering the two-dimensional vector graphic;
generating the expanded rectangle by:
determining a rectangle that encloses the control triangle; and
expanding the rectangle in a direction corresponding to the anti-aliasing direction; and
transforming vertex locations of the expanded rectangle from the pixel space to the original space according to the transformation matrix.

8. The non-transitory computer readable storage medium as in claim 1, further comprising instructions that, when executed by the at least one processor, cause the computing device to generate the expanded geometry for the control triangle by:
determining, for the control triangle, texture coordinates by mapping vertex locations of vertices in the control triangle to a texture space; and
determining barycentric coordinates of the vertices of the first triangle and the vertices of the second triangle from the expanded geometry by utilizing a geometry spread algorithm.

9. The non-transitory computer readable storage medium as in claim 8, further comprising instructions that, when executed by the at least one processor, cause the computing device to generate the expanded geometry for the control triangle by:
transforming the vertex locations for vertices in the first triangle and the vertex locations for vertices in the second triangle to a pixel space; and
determining whether each vertex of the vertices in the first triangle and of the vertices in the second triangle corresponds to a line primitive or a degenerate primitive at one or more rendering resolutions.

10. The non-transitory computer readable storage medium as in claim 9, further comprising instructions that, when executed by the at least one processor, cause the computing device to render the two-dimensional vector graphic by providing, for each triangle, the texture coordinates, the barycentric coordinates, and an indication of whether vertices of the triangle corresponds to a line primitive or a degenerate primitive to a fragment shader associated with the graphics processing unit.

11. A system comprising:
at least one computer memory device comprising a two-dimensional vector graphic; and
one or more servers configured to cause the system to:
determine a control triangle and a color representing a vector path in the two-dimensional vector graphic;
generate an expanded geometry for the control triangle by:
generating an expanded rectangle that encloses the control triangle and extends beyond an enclosing rectangle corresponding to the control triangle in an anti-aliasing direction; and
determining, within the expanded rectangle, a first triangle and a second triangle based on vertices of the expanded rectangle;
determine a first set of vertex locations and a first triangle vertex classifier for the first triangle and a second set of vertex locations and a second triangle vertex classifier for the second triangle;
generate a compressed multi-vertex buffer comprising a plurality of multi-vertex buffer entries by:
generating a first multi-vertex buffer entry by combining per-vertex data of the first triangle comprising the first set of vertex locations for the first triangle, the first triangle vertex classifier, and the color into the first multi-vertex buffer entry; and
generating a second multi-vertex buffer entry by combining per-vertex data of the second triangle comprising the second set of vertex locations, the second triangle vertex classifier, and the color into the second multi-vertex buffer entry; and
render the two-dimensional vector graphic with anti-aliasing for the vector path by processing the first multi-vertex buffer entry and the second multi-vertex buffer entry via a graphics processing unit.

12. The system as in claim 11, wherein the one or more servers are further configured to cause the system to generate the first multi-vertex buffer entry by determining:
a six-dimensional set of vertex locations comprising the first set of vertex locations for the first triangle;
a one-dimensional color value comprising the color representing the vector path; and
a two-dimensional classifier comprising the first triangle vertex classifier and a stroke classifier indicating a stroke width of the vector path.

13. The system as in claim 11, wherein the one or more servers are further configured to cause the system to render the two-dimensional vector graphic by sending a plurality of draw calls to a vertex shader of the graphics processing unit based on a vertex count within the compressed multi-vertex buffer.

14. The system as in claim 13, wherein the one or more servers are further configured to cause the system to send the plurality of draw calls to the vertex shader by:

determining, for processing the first triangle via the vertex shader, a triangle index corresponding to the first triangle;

determining, for processing the first set of vertex locations of the first triangle via the vertex shader, a set of vertex indices by expanding the first set of vertex locations from the first multi-vertex buffer entry according to a number of vertex locations within the first multi-vertex buffer entry; and sending a plurality of draw calls to the vertex shader of the graphics processing unit to process the first set of vertex locations according to the set of vertex indices.

15. The system as in claim 14, wherein the one or more servers are further configured to cause the system to send the plurality of draw calls to the vertex shader by:

determining, for processing the second triangle via the vertex shader, an additional triangle index corresponding to the second triangle;

determining, for processing the second set of vertex locations of the second triangle via the vertex shader, an additional set of vertex indices by expanding the second set of vertex locations from the second multi-vertex buffer entry according to a number of vertex locations within the second multi-vertex buffer entry; and sending an additional plurality of draw calls to the vertex shader of the graphics processing unit to process the second set of vertex locations according to the additional set of vertex indices.

16. The system as in claim 13, wherein the one or more servers are further configured to cause the system to render the two-dimensional vector graphic by:

determining, via the vertex shader, a plurality of parameters associated with texture coordinates and barycentric position coordinates of the first triangle and the second triangle by utilizing the first multi-vertex buffer entry and the second multi-vertex buffer entry; and rendering the two-dimensional vector graphic with anti-aliasing for the vector path by providing the plurality of parameters to a fragment shader of the graphics processing unit.

17. The system as in claim 11, wherein the one or more servers are further configured to cause the system to:

determine the control triangle and the color representing the vector path in the two-dimensional vector graphic by determining whether the anti-aliasing direction for the vector path is on a convex side or a concave side of the vector path;

generate the expanded geometry for the control triangle in a concave direction or a convex direction of the vector path based on the anti-aliasing direction; and generate the compressed multi-vertex buffer comprising the first multi-vertex buffer entry and the second multi-vertex buffer entry by storing the anti-aliasing direction within the first triangle vertex classifier in the first multi-vertex buffer entry and within the second triangle vertex classifier in the second multi-vertex buffer entry.

18. A computer-implemented method comprising:

determining, by at least one processor, a control triangle representing a vector path in a two-dimensional vector graphic;

generating, by the at least one processor, an expanded geometry for the control triangle by:

generating an expanded rectangle that encloses the control triangle and extends beyond an enclosing rectangle corresponding to the control triangle in an anti-aliasing direction; and determining, within the expanded rectangle, a first triangle and a second triangle based on vertices of the expanded rectangle;

generating a compressed multi-vertex buffer comprising a first multi-vertex buffer entry comprising vertex locations for vertices in the first triangle by combining per-vertex data for the vertices in the first triangle into the first multi-vertex buffer entry and a second multi-vertex buffer entry comprising vertex locations for vertices in the second triangle by combining per-vertex data for the vertices in the second triangle into the second multi-vertex buffer entry; and rendering, by the at least one processor, the two-dimensional vector graphic with anti-aliasing for the vector path by processing the compressed multi-vertex buffer via a graphics processing unit.

19. The computer-implemented method as in claim 18, wherein rendering the two-dimensional vector graphic further comprises:

expanding a multi-vertex buffer entry of the compressed multi-vertex buffer according to a vertex count within the multi-vertex buffer entry of the compressed multi-vertex buffer; and sending, to the graphics processing unit, a number of draw calls corresponding to the vertex count to process vertices of a triangle corresponding to the multi-vertex buffer entry.

20. The computer-implemented method as in claim 19, wherein rendering the two-dimensional vector graphic further comprises:

determining, by utilizing a vertex shader of the graphics processing unit, rendering parameters for the vertices of the triangle corresponding the multi-vertex buffer entry; and rendering, by utilizing a fragment shader of the graphics processing unit, the vector path with anti-aliasing in the anti-aliasing direction based on the rendering parameters.

* * * * *